(12) United States Patent
Maguire et al.

(10) Patent No.: US 7,914,416 B2
(45) Date of Patent: Mar. 29, 2011

(54) HYBRID POWERTRAIN WITH SINGLE ELECTRIC MOTOR INTEGRATED WITHIN AUTOMATIC TRANSMISSION

(75) Inventors: Joel M Maguire, Northville, MI (US); Alan G Holmes, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 572 days.

(21) Appl. No.: 11/870,438

(22) Filed: Oct. 11, 2007

(65) Prior Publication Data

US 2009/0098968 A1    Apr. 16, 2009

(51) Int. Cl.
*B60K 1/02* (2006.01)
(52) U.S. Cl. .......................... 477/5; 477/3; 477/8; 475/5
(58) Field of Classification Search ................... 477/3, 5, 477/7, 8; 475/5
See application file for complete search history.

(56) References Cited

U.S. PATENT DOCUMENTS

| | | | |
|---|---|---|---|
| 5,943,918 A | 8/1999 | Reed, Jr. et al. | |
| 6,991,585 B2 * | 1/2006 | Colvin et al. | 477/174 |
| 7,128,677 B2 * | 10/2006 | Supina et al. | 475/5 |
| 7,572,201 B2 * | 8/2009 | Supina et al. | 475/5 |
| 2005/0107198 A1 | 5/2005 | Sowul et al. | |

* cited by examiner

*Primary Examiner* — Ha D. Ho
(74) *Attorney, Agent, or Firm* — Quinn Law Group, PLLC

(57) ABSTRACT

A hybrid transmission is provided that is operatively connectable to an engine. The transmission has an electric motor and a clutch, which may be a brake-type clutch or a rotating-type clutch, depending on the embodiment, integrated within the transmission. Absent the electric motor and the clutch, and with the addition of a torque converter and torque converter lock-up clutch, the transmission would be a non-hybrid, operable automatic transmission. The transmission is operable to provide an electric-only operating ode, an engine-only operating mode, an electrically-variable operating mode and a parallel hybrid operating mode.

18 Claims, 7 Drawing Sheets

HYBRID POWERTRAIN WITH SINGLE ELECTRIC MOTOR INTEGRATED WITHIN AUTOMATIC TRANSMISSION

TECHNICAL FIELD

The invention relates to a hybrid powertrain requiring only a single electric motor that is integrated within an automatic transmission.

BACKGROUND OF THE INVENTION

Automatic transmissions often utilize selectively engagable torque-transmitting mechanism that connect different members of planetary gear sets to one another, to an input member, or to an output member to establish different fixed ratios between the input member and the output member to enable operation in different underdrive and overdrive speed ratios, allowing the engine to operate closer to its most efficient operating speed. A split-path powerflow directs power from the input member through the planetary gear sets differently depending on which of the torque-transmitting mechanisms is engaged. Automatic transmissions are often characterized in part by a hydraulic torque converter with lockup clutch between the engine and the input member of the transmission gearing, which allows the engine to spin and produce torque while the vehicle is at rest and the rotational speed of the input member is zero.

Electrically-variable transmissions typically have an input member connected to an engine and one or two motor/generators connected to different members of planetary gear sets to allow one or more electrically-variable modes of operation, fixed speed ratio modes, and an electric-only (battery powered) mode, when connected with a battery. Electrically-variable transmissions may improve vehicle fuel economy in a variety of ways. For instance, the engine may be turned off at idle, during periods of deceleration and braking, and during periods of low speed or light load operation to eliminate efficiency losses due to engine drag. Captured braking energy (via regenerative braking) or energy stored by one of the motors acting as a generator during periods when the engine is operating is utilized during these engine off periods to keep the engine off longer, supplement engine torque or power and/or operate at a lower engine speed, or supplement accessory power supplies. Transient demand for engine torque or power is supplemented by the motor/generators during operation in engine-on, electrically-variable modes, allowing for downsizing the engine without reducing apparent vehicle performance. Additionally, the engine may be operated at or near the optimal efficiency point for a given power demand because the speed ratio between the engine and the output member of the transmission can be continuously variable by the action of a gear set and a motor/generator. Additionally, the motor/generators are very efficient in accessory power generation and electric power from the battery serves as an available torque reserve allowing operation at a relatively low transmission numerical speed ratio.

SUMMARY OF THE INVENTION

A hybrid transmission is provided that is operatively connectable to an engine. The transmission is an automatic transmission that has an electric motor and a clutch, which may be a brake-type clutch or a rotating-type clutch, depending on the embodiment, integrated within the transmission. Absent the electric motor and the clutch and with a hydraulic torque converter and lockup clutch instead, the transmission would be operable as a non-hybrid, automatic transmission.

In one embodiment, the transmission has an input member, an output member, a stationary member, and multiple planetary gear sets, each with a first, a second, and a third member. Selectively engagable torque-transmitting mechanisms interconnect the planetary gear sets, the input member, the output member, and the stationary member, and are engagable in different combinations to establish various operating modes between the input member and the output member. As used herein, an "operating mode" is defined by the selectively engagable torque-transmitting mechanisms that are engaged, other clutches and brakes that are engaged, the on/off status of the engine, and the on/off status of the electric motor. The input member is operatively connected for rotation with the engine and is selectively connectable for rotation with the first member of one of the planetary gear sets by engagement of one of the torque-transmitting mechanisms, referred to as the first torque-transmitting mechanism. The electric motor is connected for rotation with the second member of another of the planetary gear sets, and the transmission has no other electric motors used for powering the transmission. The clutch connects the input member for rotation with the electric motor and the second member, and others of the torque-transmitting mechanisms are engaged. The transmission is operable in an electric-only operating mode when the engine is off and the electric motor powers the second member. The transmission is operable in an engine-only operating mode when the electric motor is off and the clutch is engaged such that the engine powers the second member. The transmission is operable in a parallel hybrid operating mode when the first torque-transmitting mechanism is engaged, the engine and electric motor are on and the engine is spinning faster than the electric motor so that the clutch is engaged. The transmission is operable in an electrically-variable operating mode when the first torque-transmitting mechanism is engaged, the engine and the electric motor are on, and the clutch is not engaged.

In another embodiment, the hybrid transmission includes an input member, an output member, a stationary member, and multiple planetary gear sets, each with a first, a second, and a third member, the members representing a ring gear member, a carrier member, and a sun gear member. Selectively engagable torque-transmitting mechanisms interconnect the planetary gear sets, the input member, the output member, and the stationary member, and are engagable in different combinations for establishing various operating modes, including six forward fixed speed ratios between the input member and the output member. The input member is connected for rotation with the engine, and is selectively connectable for rotation with the first member of one of the planetary gear sets by engagement of one of the torque-transmitting mechanisms, referred to as the first torque-transmitting mechanism. The input member is continuously connected for rotation with the second member of another of the planetary gear sets. An electric motor is connected for rotation with the sun gear member of the planetary gear set to which the input member is continuously connected, and the transmission has no other electric motors used for powering the transmission. A clutch is selectively engagable to ground the sun gear member of the planetary gear set to which the input member is continuously connected to the stationary member. The transmission is operable in an electric-only operating mode when the engine is off and the electric motor powers the sun gear member of the planetary gear set to which the input member is continuously connected. The transmission is operable in an engine-only operating mode when the electric motor is off, the clutch is engaged, and the engine powers the second member to which the input member is continuously connected. The transmission is operable in a parallel hybrid operating mode when the torque-transmitting mechanism that selectively connects the input member for rotation with the first member of one of the planetary gear sets is engaged, selected others of the torque-transmitting mechanisms are engaged, the engine and electric motor are on, and the clutch is not engaged. The transmission is operable in an electrically-variable operating mode when the torque-transmitting mechanism that selectively connects the input member for rotation with the first member of one of the planetary gear sets is not engaged, another of the torque-transmitting mechanisms is engaged to ground the first member of the one of the planetary gear sets to the stationary member, the engine and the electric motor are on, and the clutch is not engaged.

In another embodiment, the hybrid transmission includes an input member, an output member, a stationary member, and first, second, third, and fourth planetary gear sets each with a ring gear member, a sun gear member, and a carrier member. Four selectively engagable torque-transmitting mechanisms interconnect the planetary gear sets, the input member, the output member, and the stationary member, and are engagable in different combinations for establishing different operating modes, including eight forward fixed speed ratios, between the input member and the output member. The input member is connected for rotation with the engine, is selectively connectable for rotation with a sun gear member of one of the third and fourth planetary gear sets by engagement of one of the torque-transmitting mechanisms, referred to as the first torque-transmitting mechanism, and is continuously connected for rotation with a carrier member of one of the first and second planetary gear sets. An electric motor is connected for rotation with a sun gear member of the planetary gear set to which the input member is continuously connected. A brake-type clutch is selectively engagable to ground the sun gear member of one of the first and second planetary gear sets to the stationary member. The transmission is operable in an electric-only operating mode in which the engine is off, the brake-type clutch is not engaged, and the electric motor powers the sun gear member of the planetary gear set to which the input member is continuously connected. The transmission is operable in an engine-only operating mode in which the electric motor is off, the brake-type clutch is engaged and the engine powers the carrier member to which the input member is continuously connected. The transmission is operable in a parallel hybrid operating mode when any combination of three of the four torque-transmitting mechanisms are engaged, the engine and electric motor are on, and the brake-type clutch is not engaged. The transmission is operable in an electrically-variable operating mode when selected different combinations of two of the torque-transmitting mechanisms are engaged, the engine and electric motor are on, and the brake-type clutch is not engaged.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
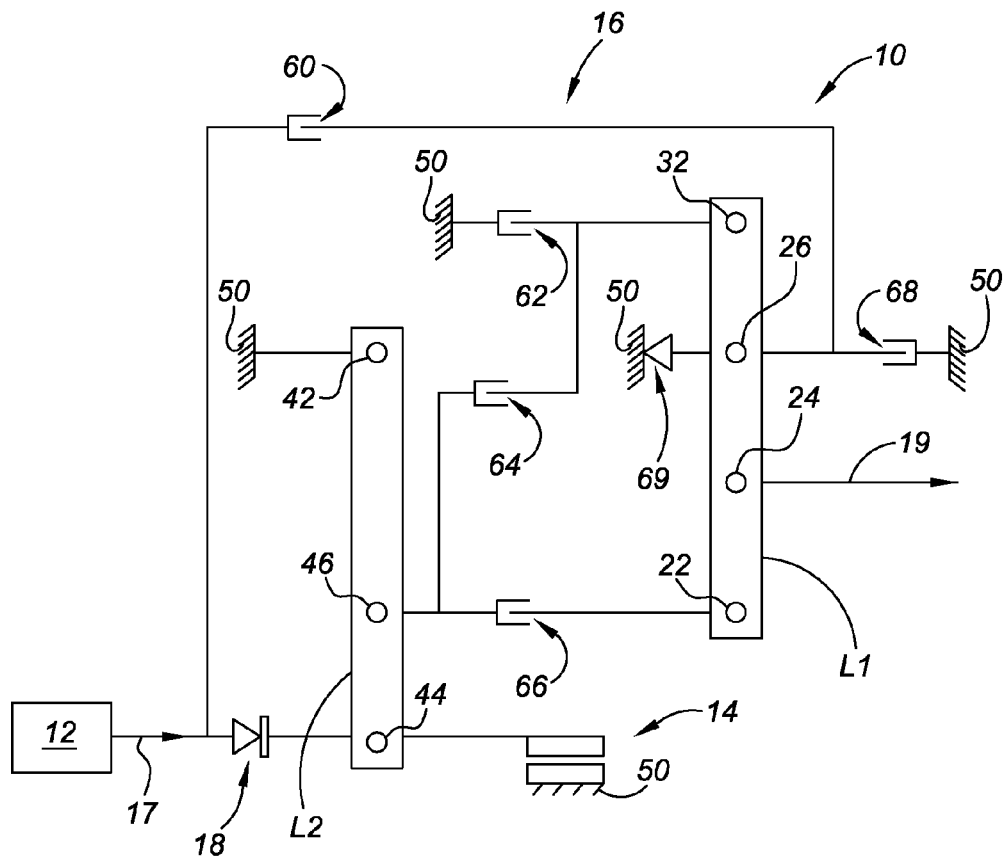
FIG. 1 is a schematic illustration in lever diagram form of a powertrain having a first embodiment of a hybrid transmission within the scope of the invention having six fixed speed ratios.

Referring to the drawings, wherein like reference numbers refer to like components, FIG. 1 shows a powertrain 10 in lever diagram form. The powertrain 10 is a hybrid powertrain that includes an engine 12, such as an internal combustion engine, and an electric motor 14 operatively connected to a transmission 16 arranged to operate as an automatic six-speed transmission in the absence of the electric motor 14. That is, the hybrid transmission 16 is a modification of a six-speed automatic transmission that enables operation as a power-split hybrid transmission by the addition of an electric motor 14 as well as a one-way clutch 18. The transmission 16 includes an input member 17 and an output member 19. When the engine 12 is on and powering the input member 17, the one-way clutch 18 engages the input member 17 with the fifth node 44. When the electric motor 14 powers the fifth node 44, the one-way clutch 18 overruns. When both the engine 12 and the electric motor 14 are on and the engine 12 is rotating faster than the motor/generator 14, the one-way clutch 18 engages to transfer torque from the input member 17 to the fifth node 44. As used herein, the engine 12 and/or the electric motor 14 are "on" when used to power the transmission. The electric motor 14 is powered by energy stored in a battery (not shown) operatively connected to the electric motor 14 via a power inverter (not shown) to provide power to the electric motor 14 under the control of a controller (not shown), as is understood by those skilled in the art of transmission design.

The transmission includes multiple planetary gear sets representable by a four-node lever L1 and a three-node lever L2. As used herein, a "node" is a component of a transmission, such as a ring gear member, a carrier member, or a sun gear member, which is characterized by a rotational speed and which can act as a junction of torques applied to that component from other components and by that component to other components. The other components which may interact with a given node include other coaxial members of the same set of planetary gears which appear as other nodes on the same lever. The other components which may interact with a given node also include interconnections to members of other planetary gear sets which appear as nodes on another lever, a stationary member such as the transmission case, and other transmission members.

The four-node lever L1 represents interconnected planetary gear sets that include a first node 26, which is preferably a carrier member, a second node 24, which is preferably a ring gear member, a third node 32, which is preferably a sun gear member, and fourth node 22, which is preferably another sun gear member.

The three-node lever L2 represents a simple planetary gear set having three nodes including a fifth node 44, which is preferably a ring gear member, a sixth node 46, which is preferably a carrier member, and a seventh node 42, which is preferably a sun gear member.

The transmission 16 includes several selectively engagable torque-transmitting mechanisms. Clutch 60 is a first torque-transmitting mechanism selectively engagable to connect the input member 17 for rotation with the first node 26. A brake-type clutch 62 is selectively engagable to ground the third node 32 to a stationary housing 50, which is a casing surrounding all of the planetary gear sets and torque-transmitting mechanisms of the transmission 16. Although shown only in disjointed fragments in the schematic illustration of FIG. 1, the stationary housing 50 may be one or more components, including radially extending support members, integrally connected to form a casing generally encircling the transmission 16 and defining an outer periphery thereof, as is known. Clutch 64 is a third torque-transmitting mechanism selectively engagable to connect the sixth node 46 for common rotation with the third node 32. Clutch 66 is a fourth torque-transmitting mechanism selectively engagable to connect the sixth node 46 for common rotation with the first node 22. Brake-type clutch 68 is a fifth torque-transmitting mechanism selectively engagable to ground the first node 26 to the stationary housing 50. The torque-transmitting mechanism 69 is a freewheeling (one-way) clutch. When engaged, the clutch 69 connects the carrier member 26 with a stationary member 50, i.e., the transmission casing. The seventh node 42 is continuously grounded to the stationary housing 50.

When the engine 12 is on and the electric motor 14 is off, the transmission 16 is operable as a six-speed automatic transmission. A fixed reverse speed ratio is achieved by engaging torque-transmitting mechanisms 64 and 68. A first fixed forward speed ratio is achieved by engaging torque-transmitting mechanisms 66 and 68. A second fixed forward speed ratio is achieved by engaging torque-transmitting mechanisms 62 and 66. A third fixed forward speed ratio is achieved by engaging torque-transmitting mechanisms 64 and 66. A fourth fixed forward speed ratio is achieved by engaging torque-transmitting mechanisms 60 and 66. A fifth fixed forward speed ratio is achieved by engaging torque-transmitting mechanisms 60 and 64. A sixth fixed forward speed ratio is achieved by engaging torque-transmitting mechanisms 60 and 62. Each of these fixed forward speed ratios are engine-only operating modes in which the one-way clutch 18 is engaged, the electric motor 14 is off, and only the engine 12 provides power to the output member 19 though the planetary gear sets represented by the levers L1 and L2. Torque may be provided to the output member 19 in this manner with torque-transmitting mechanisms 66, 68 and 69 engaged to establish friction launch of the output member 19.

The transmission 16 is also operable to provide an electric-only operating mode. In this operating mode, the engine 12 is off, only the electric motor 14 is powering the fifth node 44 with the one-way clutch 18 overrunning, and the torque-transmitting mechanisms 66, 68 and 69 engaged. Torque may be provided to the output member 19 in this manner to launch the output member 19 (i.e., start rotation of the output member 19 from a stationary state), establishing electric-only launch.

The transmission 16 is operable in a parallel hybrid operating mode in which both the engine 12 and the electric motor 14 provide power to the fifth node 44 and the clutch 60 is engaged to allow split power flow paths through the fifth node 44 and the first node 26. Torque may be provided to the output member 19 in this manner to launch the output member 19 (i.e., start rotation of the output member 19 from a stationary state), establishing combined friction and electric launch. The added torque from the electric motor 14 enables the use of friction launch without significant impact on oil durability and shudder, as less energy is dissipated in the clutch 68 than if all launch torque was provided by the engine through the clutch 68. Electrically-variable operating modes are available if the electric motor 14 turns faster than the engine 12, so that the one-way clutch 18 overruns, and the torque-transmitting mechanism 60 is engaged. The operating modes of the transmission 16 are set forth below in Table 1.

TABLE 1

| OPERATING MODE | ENGINE | ELECTRIC MOTOR | ENGAGED TORQUE-TRANSMITTING MECHANISMS AND CLUTCHES |
|---|---|---|---|
| Fixed Reverse Speed Ratio | On | Off | 64, 68 |
| Fixed First Forward Speed Ratio | On | Off | 66, 68 |
| Fixed Second Forward Speed Ratio | On | Off | 62, 66 |
| Fixed Third Forward Speed Ratio | On | Off | 64, 66 |
| Fixed Fourth Forward Speed Ratio | On | Off | 60, 66 |
| Fixed Fifth Forward Speed Ratio | On | Off | 60, 64 |
| Fixed Sixth Forward Speed Ratio | On | Off | 60, 62 |
| Electric-Only Operating Mode | Off | On | 66, 68, 69 |
| Parallel Hybrid Operating Mode | On (turning faster than electric motor) | On | 60 |
| Electrically-Variable Operating Mode | On | On (turning faster than engine) | 60 |

Figure 2:
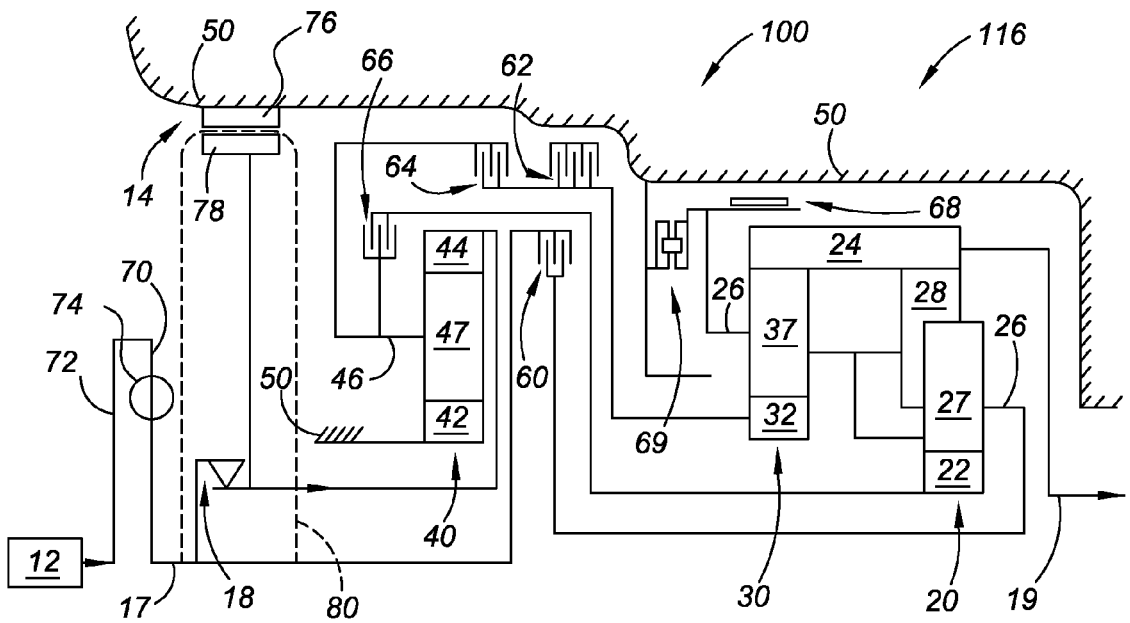
FIG. 2 is a schematic illustration in stick diagram form of a second embodiment of a hybrid transmission within the scope of the lever diagram of FIG. 1.

Referring to FIG. 2, one specific implementation of the powertrain 10 and transmission 16 of FIG. 1 is illustrated in stick diagram form as powertrain 100 and transmission 116. The four-node lever L1 of FIG. 1 is equivalent to the compounded planetary gear sets 20 and 30. Planetary gear set 20 includes a sun gear member 22 (i.e., the fourth node), a ring gear member 24 (i.e., the second node) and a carrier member 26 (i.e., the first node) that rotatably supports first and second sets of pinion gears 27, 28, respectively. The pinion gears 27 intermesh with the sun gear member 22 and the pinion gears 28. The pinion gears 28 intermesh with the pinion gears 27 and with the ring gear member 24. The carrier member 26 also supports a set of pinion gears 37 of the second planetary gear set 30. The second planetary gear set 30 further includes a sun gear member 32 (i.e., the third node) that meshes with the pinion gears 37. The ring gear member is elongated to also mesh with pinion gears 37.

The three-node lever is equivalent to the planetary gear set 40 which includes a ring gear member 44 (i.e., the fifth node), a sun gear member 42 (i.e., the seventh node), and a carrier member 46 (i.e., the sixth node) that rotatably supports a set of pinion gears 47 that intermesh with both the ring gear member 44 and the sun gear member 42.

The electric motor 14 and one-way clutch 18 are housed axially between the engine 12 and the planetary gear sets 20, 30 and 40, adjacent a dampener assembly 70 that is connected with the transmission input member 17 and provides torsional damping between a flywheel 72 of the engine 12 and the transmission 116, such as by springs 74, as is known in the art. A stator portion 76 of the motor 14 is grounded to the transmission casing 50 and a rotor portion 78 rotates with the ring gear member 44, and with the input member 17 via the one-way clutch 18 if the engine 12 is on. In other words, if the engine 12 is on, the one-way clutch 18 engages (assuming the input member 17 is rotating faster than the electric motor 14) and the rotation of the input member 17 is transferred to the ring gear member 44. However, if the engine 12 is not on or the electric motor 14 is rotating faster than the engine 12, the one-way clutch 18 will overrun if the electric motor 14 is powered, so that the speed of the rotor portion 78 will determine the speed of the ring gear member 44. The sun gear member 42 is continuously grounded to the transmission casing 50. This is illustrated by showing a portion of the casing 50, which could be a radially extending support pillar that connects to the outer periphery of the casing 50, adjacent the sun gear member 42.

The area within the casing 50 in which the electric motor 14 and one-way clutch 18 are packaged is the same area that generally holds a torque-converter in a non-hybrid automatic transmission, e.g., the bell housing portion of the casing 50, as illustrated schematically by the slight flare in the casing 50. Replacing the torque converter with the electric motor 14 and one-way clutch 18 may allow room for packaging power electronics for the electric motor 14 within the same area as well.

Alternatively, the powertrain 10 could include both a torque converter, potentially with a lockup clutch, and an electric motor 14, possibly connected peripherally around the torque converter. The torque converter would be located between engine 12 and input member 17 and allow the engine to spin and develop torque with the vehicle and gearing at rest.

Figure 3:
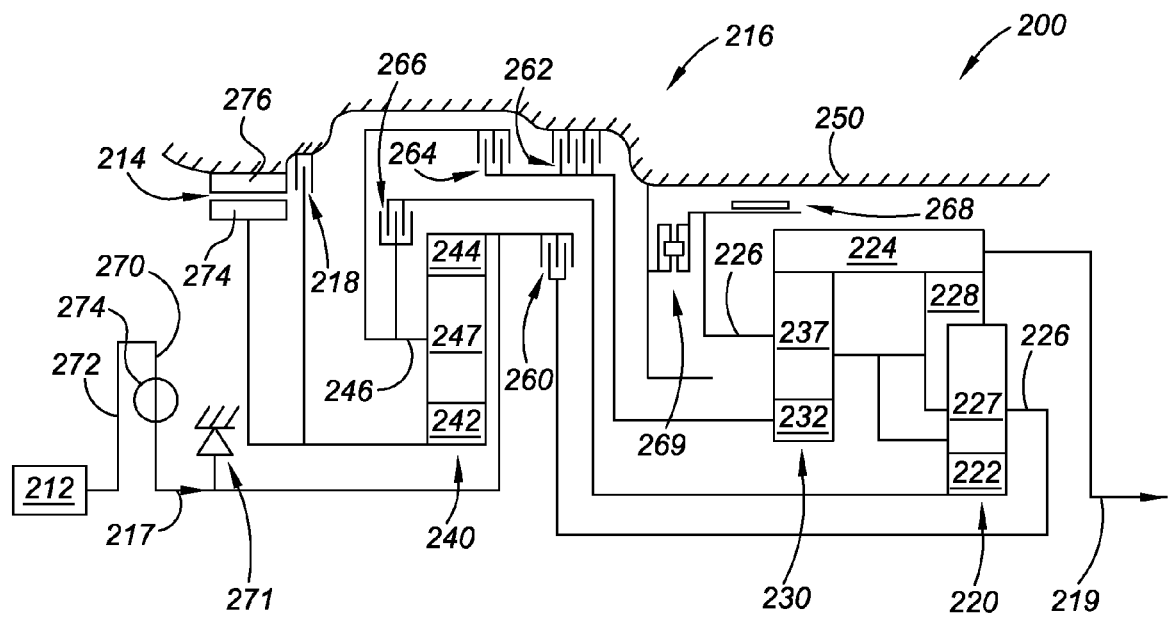
FIG. 3 is a schematic illustration in stick diagram form of a powertrain having a third embodiment of a hybrid transmission within the scope of the invention having six fixed speed ratios.

Referring now to FIG. 3, another embodiment of a powertrain 200 is illustrated that includes a transmission 216 operatively connected to an engine 212, such as an internal combustion engine, and an electric motor 214 operatively connected to a transmission 216 arranged to operate as an automatic six-speed transmission in the absence of the electric motor 214. That is, the hybrid transmission 216 is a modification of a six-speed automatic transmission that enables operation as a power-split hybrid transmission by the addition of an electric motor 214 as well as a clutch 218.

The transmission 216 includes an input member 217 and an output member 219. The transmission includes compounded planetary gear sets 220 and 230. Planetary gear set 220 includes a sun gear member 222, a ring gear member 224 and a carrier member 226 that rotatably supports first and second sets of pinion gears 227, 228, respectively. The pinion gears 227 intermesh with the sun gear member 222 and the pinion gears 228. The pinion gears 228 intermesh with the pinion gears 227 and with the ring gear member 224. The carrier member 226 also supports a set of pinion gears 237 of the second planetary gear set 230. The second planetary gear set 230 further includes a sun gear member 232 that meshes with the pinion gears 237. The ring gear member 224 is elongated to also mesh with pinion gears 237.

A planetary gear set 240 includes a ring gear member 244, a sun gear member 242, and a carrier member 246 that rotatably supports a set of pinion gears 247 that intermesh with both the ring gear member 244 and the sun gear member 242.

The transmission 216 includes several selectively engagable torque-transmitting mechanisms. Clutch 260 is a first torque-transmitting mechanism selectively engagable to connect the input member 217 for rotation with the carrier member 226. A brake-type clutch 262 is selectively engagable to ground the sun gear member 232 to a stationary housing 250, which is a casing surrounding all of the planetary gear sets and torque-transmitting mechanisms of the transmission 216. The stationary housing 250 may be one or more components, including radially extending support members, integrally connected to form a casing generally encircling the transmission 216 and defining an outer periphery thereof, as is known. Clutch 264 is a third torque-transmitting mechanism selectively engagable to connect the carrier member 246 for common rotation with the sun gear member 232. Clutch 266 is a fourth torque-transmitting mechanism selectively engagable to connect the ring gear member 246 for common rotation with the sun gear member 222. Brake-type clutch 268 is a fifth torque-transmitting mechanism selectively engagable to ground the carrier member 226 to the stationary housing 250. The torque-transmitting mechanism 269 is a freewheeling (one-way) clutch. The clutch 269 connects the carrier member 226 with a stationary member 250, i.e., the transmission casing. The clutch 218 selectively grounds the sun gear member 242 to the transmission casing 250. The one-way clutch 271 freewheels when the input member 217 rotates in a forward direction and engages to prevent rotation of the input member 217 in a reverse direction. Alternatively, the one-way clutch 271 may be replaced by a selectively engagable brake.

The electric motor 214 and clutch 218 are housed axially between the engine 212 and the planetary gear sets 220, 230 and 240, adjacent a dampener assembly 270 that is connected with the transmission input member 217 and provides torsional damping between a flywheel 272 of the engine 212 and the transmission 216, such as by springs 274, as is known in the art. A stator portion 276 of the motor 214 is grounded to the transmission casing 260 and a rotor portion 278 rotates commonly with the sun gear member 242. The electric motor 214 is powered by energy stored in a battery (not shown) operatively connected to the electric motor 214 via a power inverter (not shown) to provide power to the electric motor 214 under the control of a controller (not shown), as is understood by those skilled in the art of transmission design.

When the engine 212 is on and the electric motor 214 is off, the transmission 216 is operable as a six-speed automatic transmission. A fixed reverse speed ratio is achieved by engaging torque-transmitting mechanisms 264 and 268. A first fixed forward speed ratio is achieved by engaging torque-transmitting mechanisms 266 and 218 along with torque-transmitting mechanism 268 or 269 or both 268 and 269. A second fixed forward speed ratio is achieved by engaging torque-transmitting mechanisms 262, 266 and 218. A third fixed forward speed ratio is achieved by engaging torque-transmitting mechanisms 264, 266 and 218. A fourth fixed forward speed ratio is achieved by engaging torque-transmitting mechanisms 260, 266 and 218. A fifth fixed forward speed ratio is achieved by engaging torque-transmitting mechanisms 260 and 218. A sixth fixed forward speed ratio is achieved by engaging torque-transmitting mechanisms 260 and 262. Other fixed speed ratios that are not part of the sequence are also possible, such as an intermediate fixed forward speed ratio between the fourth and the fifth fixed forward speed ratio achieved by engaging torque-transmitting mechanisms 260, 264 and 266. Each of these fixed forward speed ratios are engine-only operating modes, as the electric motor 214 is off, and only the engine 212 provides power to the output member 219 though the planetary gear sets 220. 230 and 240. Torque may be provided to the output member 219 in this manner with torque-transmitting mechanisms 266, 268, 269 and 218 engaged to establish friction launch of the output member 219.

The area within the casing 250 in which the electric motor 214 and clutch 218 are packaged is the same area that generally holds a torque-converter in an automatic transmission that is not hybrid, e.g., the bell housing portion of the casing, as illustrated schematically by the slight flare in the casing 250. Replacing the torque converter with the electric motor 214 and clutch 218 may allow room for packaging power electronics for the electric motor 214 within the same area as well. Alternately, a torque converter could be included in place of the flywheel 272 along with the remainder of the arrangement shown.

The transmission 216 is also operable to provide an electric-only operating mode. In this operating mode, the engine 212 is off, only the electric motor 214 is powering the sun gear member 242 with the clutch 218 not engaged, and the torque-transmitting mechanisms 266, 268, 269, and 271 are engaged. Torque may be provided to the output member 219 in this manner to launch the output member 219 (i.e., start rotation of the output member 219 from a stationary state), establishing electric-only launch.

The transmission 216 is operable in an electrically-variable hybrid operating mode in which the engine 212 provides power to the ring gear member 244 and the electric motor 214 provides power to the sun gear member 242 (or electric motor 214 absorbs power from sun gear member 242), and the clutches 266 and 268 are engaged to allow split power flow paths through the sun gear member 242 and the ring gear member 244. Torque may be provided to the output member 219 in this manner to launch the output member 219 (i.e., start rotation of the output member 219 from a stationary state) by allowing sun gear 242 to rotate backwards while the ring gear 244, input member 217 and engine 212 are rotating forward, establishing hybrid electric launch. When the electric motor 214 provides forward torque and rotates backwards, it absorbs mechanical power and produces electrical power to be absorbed by a battery (not shown) or by other electrical devices aboard the vehicle. Clutch 266 may or may not be allowed to slip to also absorb mechanical power during the launch. The electrically-variable operating modes are available when the engine 212 is on, the electric motor 214 is on, the clutch 218 is not engaged, and the required torque-transmitting mechanisms are engaged that establish the first, the second, the third, the fourth or the fifth fixed forward speed ratio, as listed above. Two parallel hybrid operating modes are available for driving with the engine 12 on, the clutch 218 not engaged, the electric motor 214 powering the sun gear member 242, and the required torque-transmitting mechanisms engaged that establish the sixth or the intermediate fixed forward speed ratios, as listed above. Clutch 266 is also engaged in the parallel hybrid operating mode based on the sixth forward speed ratio. The parallel hybrid operating modes have fixed transmission speed ratios between the input member 217 and the output member 219, with electric motor 214 providing additional power to the output member 219 by using power from a battery (not shown) or providing electrical power to the battery or other electrical devices (not shown) by using some of the power provided to the input member 217 by the engine 212. The operating modes of the transmission 216 are set forth below in Table 2.

TABLE 2

| OPERATING MODE | ENGINE | ELECTRIC MOTOR | ENGAGED TORQUE-TRANSMITTING MECHANISMS AND CLUTCHES |
|---|---|---|---|
| Fixed Reverse Speed Ratio | On | Off | 264, 268 |
| Fixed First Forward Speed Ratio | On | Off | 266, 218, 268 and/or 269 |
| Fixed Second Forward Speed Ratio | On | Off | 262, 266, 218 |
| Fixed Third Forward Speed Ratio | On | Off | 264, 266, 218 |
| Fixed Fourth Forward Speed Ratio | On | Off | 260, 266, 218 |
| Fixed Fifth Forward Speed Ratio | On | Off | 260, 218 |
| Fixed Sixth Forward Speed Ratio | On | Off | 260, 262 |
| Electric-Only Operating Mode | Off | On | 266, 268, 269, 271 |
| Parallel Hybrid Operating Mode | On | On | 260, 262; or 260, 264, 266 |
| Electrically-Variable Operating Mode | On | On | 266, 268 and/or 269; or 262, 266; or 264, 266; 260, 266; or 260 |

Figure 4:
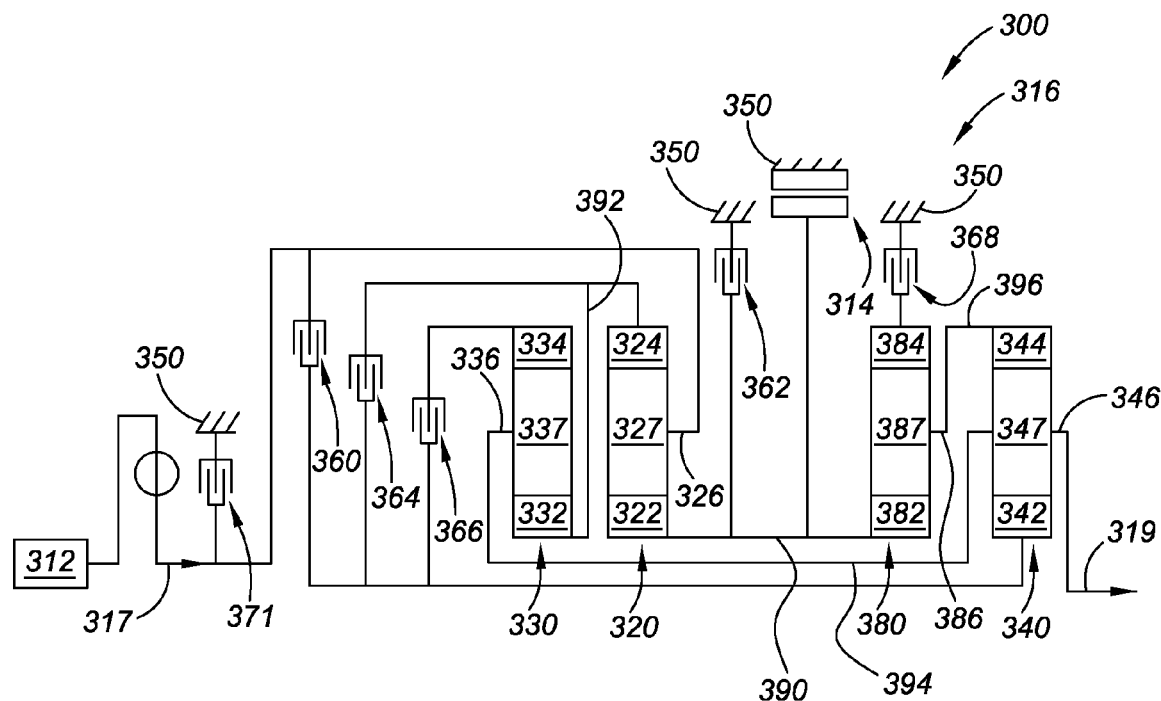
FIG. 4 is a schematic illustration in stick diagram form of a fourth embodiment of a hybrid transmission within the scope of the invention having eight fixed speed ratios.

Referring now to FIG. 4, another embodiment of a powertrain 300 is illustrated that includes a transmission 316 operatively connected to an engine 312, such as an internal combustion engine, and an electric motor 314 operatively connected to a transmission 316 arranged to operate as an automatic eight-speed transmission in the absence of the electric motor 314. That is, the hybrid transmission 316 is a modification of an eight-speed automatic transmission that enables operation as a power-split hybrid transmission by the addition of an electric motor 314 as well as a clutch 371.

The transmission 316 includes an input member 317 and an output member 319. The transmission 316 includes four single-pinion planetary gear sets 320, 330, 340 and 380. Planetary gear set 320 includes a sun gear member 322, a ring gear member 324 and a carrier member 326 that rotatably supports a plurality of pinion gears 327. The pinion gears 327 intermesh with the sun gear member 322 and the ring gear member 324. Planetary gear set 330 includes a sun gear member 332, a ring gear member 334 and a carrier member 336 that rotatably supports a plurality of pinion gears 337. The pinion gears 337 intermesh with the sun gear member 332 and the ring gear member 334. Planetary gear set 340 includes a sun gear member 342, a ring gear member 344 and a carrier member 346 that rotatably supports a plurality of pinion gears 347. The pinion gears 347 intermesh with the sun gear member 342 and the ring gear member 344. Planetary gear set 3830 includes a sun gear member 382, a ring gear member 384 and a carrier member 386 that rotatably supports a plurality of pinion gears 387. The pinion gears 387 intermesh with the sun gear member 382 and the ring gear member 384.

An interconnecting member 390 continuously connects the sun gear member 322 for common rotation with the sun gear member 382. An interconnecting member 392 continuously connects the sun gear member 332 for common rotation with the ring gear member 324. An interconnecting member 394 continuously connects the carrier member 336 for common rotation with the carrier member 346. An interconnecting member 396 continuously connects the carrier member 386 for common rotation with the ring gear member 344.

The transmission 316 includes several selectively engagable torque-transmitting mechanisms. Clutch 360 is a first torque-transmitting mechanism selectively engagable to connect the input member 371 for rotation with the sun gear member 342. A brake-type clutch 362 is selectively engagable to ground the sun gear members 332 and 382 to a stationary housing 350, which is a casing surrounding all of the planetary gear sets and torque-transmitting mechanisms of the transmission 316. The stationary housing 350 may be one or more components, including radially extending support members, integrally connected to form a casing generally encircling the transmission 316 and defining an outer periphery thereof, as is known. Clutch 364 is a third torque-transmitting mechanism selectively engagable to connect the ring gear member 324 for common rotation with the sun gear member 342. Clutch 366 is a fourth torque-transmitting mechanism selectively engagable to connect the ring gear member 334 for common rotation with the sun gear member 342. Brake-type clutch 368 is a fifth torque-transmitting mechanism selectively engagable to ground the ring gear member 384 to the stationary housing 350. The clutch 371 selectively grounds the input member 317 to the stationary housing 350 to provide reaction torque at the input member 317. Although depicted as a friction brake, alternatively, the clutch 371 could be a one-way brake-type clutch. The electric motor 314 is powered by energy stored in a battery (not shown) operatively connected to the electric motor 314 via a power inverter (not shown) to provide power to the electric motor 314 under the control of a controller (not shown), as is understood by those skilled in the art of transmission design.

When the engine 312 is on and the electric motor 314 is off, the transmission 316 is operable as an eight-speed automatic transmission. A fixed reverse speed ratio is achieved by engaging torque-transmitting mechanisms 362, 366 and 368. A first fixed forward speed ratio is achieved by engaging torque-transmitting mechanisms 360, 362 and 368. A second fixed forward speed ratio is achieved by engaging torque-transmitting mechanisms 362, 364 and 368. A third fixed forward speed ratio is achieved by engaging torque-transmitting mechanisms 360, 364 and 368. A fourth fixed forward speed ratio is achieved by engaging torque-transmitting mechanisms 364, 366 and 368. A fifth fixed forward speed ratio is achieved by engaging torque-transmitting mechanism 360, 366 and 368. A sixth fixed forward speed ratio is achieved by engaging torque-transmitting mechanisms 360, 364 and 366. A seventh fixed forward speed ratio is achieved by engaging torque-transmitting mechanisms 360, 362, and 366. An eighth fixed forward speed ratio is achieved by engaging torque-transmitting mechanisms 362, 364 and 366. Each of these fixed forward speed ratios are engine-only operating modes, as the electric motor 314 is off, and only the engine 312 provides power to the output member 319 though the planetary gear sets 320, 330, 340 and 380. Torque may be provided to the output member 319 in this manner with torque-transmitting mechanisms 360, 362, and 368 engaged to establish friction launch of the output member 319.

The transmission 316 is also operable to provide an electric-only operating mode. In this operating mode, the engine 312 is off, and only the electric motor 314 is powering the sun gear member 382 with the brake-type clutch 371 and the torque-transmitting mechanisms 360 and 368 engaged. Torque may be provided to the output member 319 in this manner to launch the output member 319 (i.e., start rotation of the output member 319 from a stationary state), establishing electric-only launch.

The transmission 316 is operable in an electrically-variable hybrid operating mode in which the engine 312 provides power to the carrier member 326 and the electric motor 314 provides power to the sun gear member 382 (or absorbs power from it), and the clutches 360 and 368 are engaged to allow power flow paths through the carrier gear member 326 and the sun gear member 382. Torque may be provided to the output member 319 in this manner to launch the output member 319 (i.e., start rotation of the output member 319 from a stationary state), and to operate the vehicle with a continuously variable transmission ratio. In general, for this embodiment, any fixed speed ratio which engages the brake-type clutch 362 which is in parallel with the electric motor 314 can be converted to an electrically-variable mode of operation by releasing the brake-type clutch 362, applying torque with the electric motor 314, and rotating the electric motor either forwards or backwards to vary the transmission speed ratio between the input member 317 and the output member 319. Depending on the direction of motor torque and rotation, the motor 314 will produce or consume electric power, which may be provided to or from a battery (not shown) or to or from other electrical devices (not shown). Thus, in addition to the electrically-variable mode described above, which is developed from the first forward fixed speed ratio described above, electrically variable modes can be developed from the fixed reverse speed ratio and the second, the seventh, and the eighth forward fixed speed ratios described above. Furthermore, any fixed speed ratio which does not engage the brake-clutch 362 which is in parallel with the electric motor 314 allows parallel hybrid operation of the transmission 316, wherein the transmission speed ratio is fixed but the electric motor 314 can produce or consume electric power, which may be provide to or from a battery (not shown) or to other electrical devices (not shown). The operating modes of the transmission 316 are set forth below in Table 3.

TABLE 3

| OPERATING MODE | ENGINE | ELECTRIC MOTOR | ENGAGED TORQUE-TRANSMITTING MECHANISMS AND CLUTCHES |
|---|---|---|---|
| Fixed Reverse Speed Ratio | On | Off | 362, 366, 368 |
| Fixed First Forward Speed Ratio | On | Off | 360, 362, 368 |
| Fixed Second Forward Speed Ratio | On | Off | 362, 364, 368 |
| Fixed Third Forward Speed Ratio | On | Off | 360, 364, 368 |
| Fixed Fourth Forward Speed Ratio | On | Off | 364, 366, 368 |

TABLE 3-continued

| OPERATING MODE | ENGINE | ELECTRIC MOTOR | ENGAGED TORQUE-TRANSMITTING MECHANISMS AND CLUTCHES |
|---|---|---|---|
| Fixed Fifth Forward Speed Ratio | On | Off | 360, 366, 368 |
| Fixed Sixth Forward Speed Ratio | On | Off | 360, 364, 366 |
| Fixed Seventh Forward Speed Ratio | On | Off | 360, 362, 366 |
| Fixed Eighth Forward Speed Ratio | On | Off | 362, 364, 366 |
| Electric-Only Operating Mode | Off | On | 360, 368, 371 |
| Parallel Hybrid Operating Mode | On | On | 360, 364, 368; or 364, 366, 368; or 360, 366, 368; or 360, 364, 366 |
| Electrically-Variable Operating Mode | On | On | 366, 368; or 360, 368; or 364, 368; 360, 366; or 364, 366 |

Figure 5:
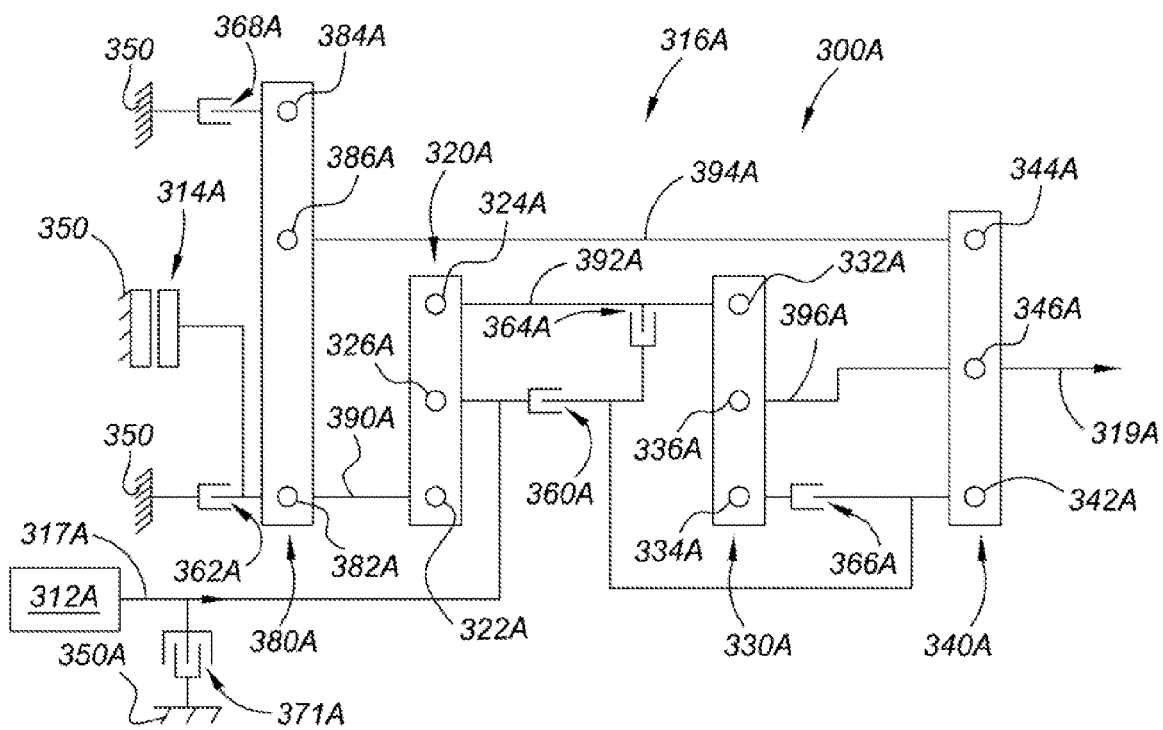
FIG. 5 is a schematic illustration in lever diagram form of the hybrid transmission of FIG. 4 within the scope of the invention having eight fixed speed ratios.

Referring to FIG. 5, the powertrain 300 of FIG. 4 is represented in lever diagram form as powertrain 300A and transmission 316A, with the planetary gear sets 320, 330, 340 and 380 of FIG. 4 represented as corresponding levers 320A, 330A, 340A and 380A. The sun gear member 322, carrier member 326, and ring gear member 324 of gear set 320 are represented as corresponding node 322A, node 326A and node 324A. The sun gear member 332, carrier member 336, and ring gear member 334 are represented as corresponding nodes 332A, 336A and 334A. The sun gear member 342, carrier member 346, and ring gear member 344 are represented as corresponding nodes 342A, 346A and 344A. The sun gear member 382, carrier member 386, and ring gear member 384 are represented as corresponding nodes 382A, 386A and 384A. Interconnecting member 390A continuously connects node 382A for common rotation with node 322A. Interconnecting member 392A continuously connects node 324A for common rotation with node 332A. Interconnecting member 394A continuously connects node 386A for common rotation with node 344A. Interconnecting member 396A continuously connects node 336A for common rotation with node 346A.

The transmission 316A includes several selectively engagable torque-transmitting mechanisms. Clutch 360A is a first torque-transmitting mechanism selectively engagable to connect the input member 317A for rotation with node 342A. A brake-type clutch 362A is selectively engagable to ground nodes 322A and 382A to a stationary housing 350A, which is a casing surrounding all of the planetary gear sets and torque-transmitting mechanisms of the transmission 316A. The stationary housing 350A may be one or more components, including radially extending support members, integrally connected to form a casing generally encircling the transmission 316A and defining an outer periphery thereof, as is known. Clutch 364A is a third torque-transmitting mechanism selectively engagable to connect node 324A and node 332A for common rotation with node 342A. Clutch 366A is a fourth torque-transmitting mechanism selectively engagable to connect the node 334A for common rotation with node 342A. Brake-type clutch 368A is a fifth torque-transmitting mechanism selectively engagable to ground the ring gear member 384A to the stationary housing 350A. The clutch 371A selectively grounds the input member 317A to the stationary housing 350A to provide reaction torque at the input member 317A. Although depicted as a friction brake-type torque-transmitting mechanism, alternatively, clutch 371A could be a one-way brake-type torque-transmitting mechanism.

When the engine 312A is on and the electric motor 314A is off, the transmission 316A is operable as an eight-speed automatic transmission. A fixed reverse speed ratio is achieved by engaging torque-transmitting mechanisms 362A, 366A and 368A. A first fixed forward speed ratio is achieved by engaging torque-transmitting mechanisms 360A, 362A and 368A. A second fixed forward speed ratio is achieved by engaging torque-transmitting mechanisms 362A, 364A and 368A. A third fixed forward speed ratio is achieved by engaging torque-transmitting mechanisms 360A, 364A and 368A. A fourth fixed forward speed ratio is achieved by engaging torque-transmitting mechanisms 364A, 366A and 368A. A fifth fixed forward speed ratio is achieved by engaging torque-transmitting mechanism 360A, 366A and 368A. A sixth fixed forward speed ratio is achieved by engaging torque-transmitting mechanisms 360A, 364A and 366A. A seventh fixed forward speed ratio is achieved by engaging torque-transmitting mechanisms 360A, 362A, and 366A. An eighth fixed forward speed ratio is achieved by engaging torque-transmitting mechanisms 362A, 364A and 366A. Each of these fixed forward speed ratios are engine-only operating modes, as the electric motor 314 is off, and only the engine 312 provides power to the output member 319A though the planetary gear sets, shown as levers 320A, 330A, 340A and 380A. Torque may be provided to the output member 319A in this manner with torque-transmitting mechanisms 360A, 362A, and 368A engaged to establish friction launch of the output member 319A.

The transmission 316A is also operable to provide an electric-only operating mode. In this operating mode, the engine 312A is off, and only the electric motor 314A is powering node 382A (representing the sun gear member of the planetary gear set represented by lever 320A) with the brake-type clutch 371A and the torque-transmitting mechanisms 360A and 368A engaged. Torque may be provided to the output member 319A in this manner to launch the output member 319A (i.e., start rotation of the output member 319A from a stationary state), establishing electric-only launch.

The transmission 316A is operable in an electrically-variable operating mode in which the engine 312A provides power to the node 326A, representing the carrier member of the planetary gear set represented by lever 320A, the electric motor 214A provides power to node 382A, representing the sun gear member of the planetary gear set represented by lever 320A, and the clutches 360A and 368A are engaged to allow power flow paths through node 326A and node 382A. Torque may be provided to the output member 319A in this manner to launch the output member 319A, establishing combined friction and electric launch. A parallel hybrid operating mode may also be established by powering the electric motor 314 during any of the third, fourth, fifth, and sixth forward speed ratios discussed above. An electrically-variable operating mode may be established by releasing the torque-transmitting mechanism 362A and powering the electric motor 314 during any of the fixed reverse, first, second, seventh and eighth fixed forward speed ratios. The operating modes of the transmission 316A are set forth below in Table 4.

TABLE 4

| OPERATING MODE | ENGINE | ELECTRIC MOTOR | ENGAGED TORQUE-TRANSMITTING MECHANISMS AND CLUTCHES |
|---|---|---|---|
| Fixed Reverse Speed Ratio | On | Off | 362A, 366A, 368A |
| Fixed First Forward Speed Ratio | On | Off | 360A, 362A, 368A |
| Fixed Second Forward Speed Ratio | On | Off | 362A, 364A, 368A |
| Fixed Third Forward Speed Ratio | On | Off | 360A, 364A, 368A |
| Fixed Fourth Forward Speed Ratio | On | Off | 364A, 366A, 368A |
| Fixed Fifth Forward Speed Ratio | On | Off | 360A, 366A, 368A |
| Fixed Sixth Forward Speed Ratio | On | Off | 360A, 364A, 366A |
| Fixed Seventh Forward Speed Ratio | On | Off | 360A, 362A, 366A |
| Fixed Eighth Forward Speed Ratio | On | Off | 362A, 364A, 366A |
| Electric-Only Operating Mode | Off | On | 360A, 368A, 371A |
| Parallel Hybrid Operating Mode | On | On | 360A, 364A, 368A; or 364A, 366A, 368A; or 360A, 366A, 368A; or 360A, 364A, 366A |
| Electrically-Variable Operating Mode | On | On | 366A, 368A; or 360A, 368A; or 364A, 368A; 360A, 366A; or 364A, 366A |

In an alternative embodiment not shown, the motor 314A is connected to node 384A rather than node 382A. With this embodiment, following the engagement schedule set forth in Table 4 will result in electrically-variable operating modes corresponding with the first-fifth fixed forward speed ratios in Table 4 by releasing torque-transmitting mechanism 368A and powering the electric motor 314A. A parallel hybrid operating mode may be established by powering the electric motor 314A during any of the sixth-eighth fixed forward speed ratios in Table 4.

Figure 6:
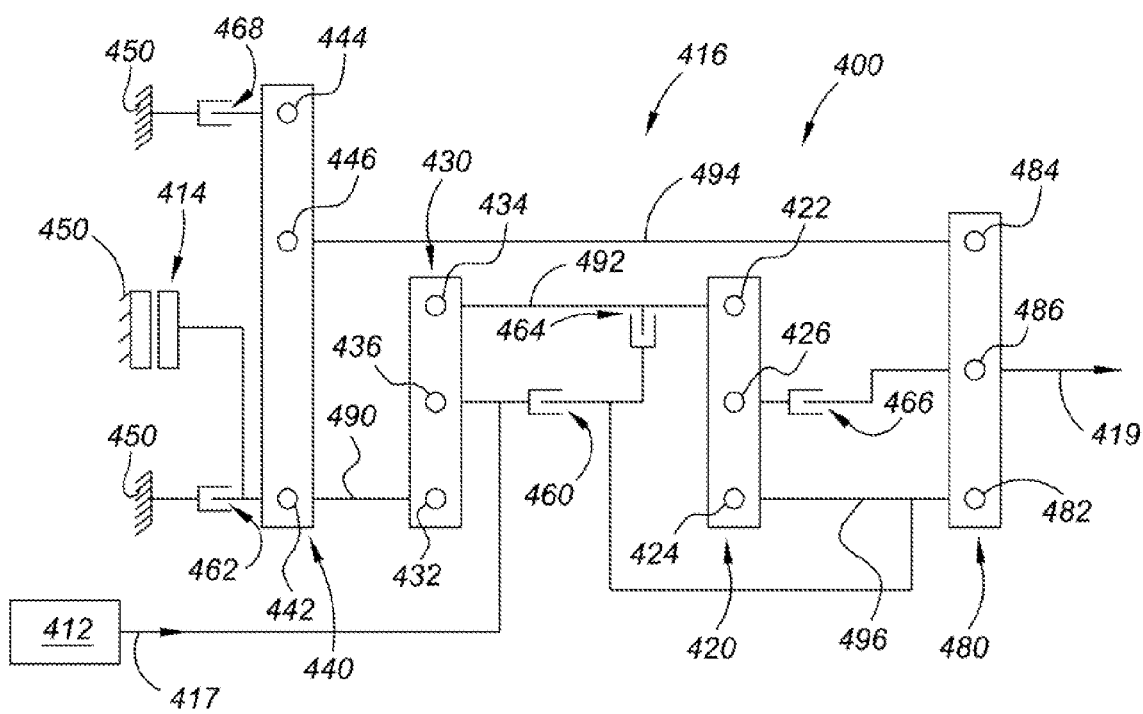
FIG. 6 is a schematic illustration in lever diagram form of a fifth embodiment of a hybrid transmission within the scope of the invention having eight fixed speed ratios.

Referring now to FIG. 6, another embodiment of a powertrain 400 is illustrated that includes a transmission 416 illustrated in lever diagram form operatively connected to an engine 412, such as an internal combustion engine, and an electric motor 414 operatively connected to the transmission 416, which is arranged to operate as an automatic eight-speed transmission in the absence of the electric motor 414. That is, the hybrid transmission 416 is a modification of an eight-speed automatic transmission that enables operation as a power-split hybrid transmission by the addition of an electric motor 414 at a selectively grounded sun gear member.

The transmission 416 includes an input member 417 and an output member 419. The transmission 416 includes four single-pinion planetary gear sets (i.e., a first, a second, a third, and a fourth planetary gear set) represented in lever diagram form as levers 420, 430, 440 and 480. Lever 420 includes nodes 422, 424 and 426 that represent a sun gear member, a ring gear member and a carrier member, respectively. Lever 430 includes nodes 432, 434 and 436 that represent a sun gear member, a carrier member and a ring gear member, respectively. Lever 440 includes nodes 442, 444 and 446 that represent a sun gear member, a ring gear member and a carrier member, respectively. Lever 480 includes nodes 482, 484 and 486 representing a sun gear member, a ring gear member, and a carrier member, respectively.

An interconnecting member 490 continuously connects node 442 for common rotation with node 432. An interconnecting member 492 continuously connects node 422 for common rotation with the node 434. An interconnecting member 494 continuously connects node 446 for common rotation with node 484. An interconnecting member 496 continuously connects node 482 for common rotation with node 424.

The transmission 416 includes several selectively engagable torque-transmitting mechanisms. Clutch 460 is a first torque-transmitting mechanism selectively engagable to connect the input member 417 for rotation with nodes 424 and 482. A brake-type clutch 462 is selectively engagable to ground nodes 432 and 442 to a stationary housing 450, which is a casing surrounding all of the planetary gear sets and torque-transmitting mechanisms of the transmission 416. The stationary housing 450 may be one or more components, including radially extending support members, integrally connected to form a casing generally encircling the transmission 416 and defining an outer periphery thereof, as is known. Clutch 464 is a third torque-transmitting mechanism selectively engagable to connect nodes 434 and 422 for common rotation with nodes 424 and 482. Clutch 466 is a fourth torque-transmitting mechanism selectively engagable to connect node 426 for common rotation with node 486. Brake-type clutch 468 is a fifth torque-transmitting mechanism selectively engagable to ground node 444 to the stationary housing 450. A friction brake-type clutch (not shown) may also be provided to selectively ground the input member 417 to the stationary housing 450 to provide reaction torque at the input member 417. The electric motor 414 is powered by energy stored in a battery (not shown) operatively connected to the electric motor 414 via a power inverter (not shown) to provide power to the electric motor 414 under the control of a controller (not shown), as is understood by those skilled in the art of transmission design.

When the engine 412 is on and the electric motor 414 is off, the transmission 416 is operable as an eight-speed automatic transmission. A fixed reverse speed ratio is achieved by engaging torque-transmitting mechanisms 462, 466 and 468. A first fixed forward speed ratio is achieved by engaging torque-transmitting mechanisms 460, 462 and 468. A second fixed forward speed ratio is achieved by engaging torque-transmitting mechanisms 462, 464 and 468. A third fixed forward speed ratio is achieved by engaging torque-transmitting mechanisms 460, 464 and 468. A fourth fixed forward speed ratio is achieved by engaging torque-transmitting mechanisms 464, 466 and 468. A fifth fixed forward speed ratio is achieved by engaging torque-transmitting mechanisms 460, 466 and 468. A sixth fixed forward speed ratio is achieved by engaging torque-transmitting mechanisms 460, 464 and 466. A seventh fixed forward speed ratio is achieved by engaging torque-transmitting mechanisms 460, 462, and 466. An eighth fixed forward speed ratio is achieved by engaging torque-transmitting mechanisms 462, 464 and 466. Each of these fixed forward speed ratios are engine-only operating modes, as the electric motor 414 is off, and only the engine 412 provides power to the output member 419 though the planetary gear sets represented by levers 420, 430, 440 and 480. Torque may be provided to the output member 419 in this manner with torque-transmitting mechanisms 460, 462, and 468 engaged to establish friction launch of the output member 419.

The transmission 416 is also operable to provide an electric-only operating mode. In this operating mode, the engine 412 is off, and only the electric motor 414 is powering the node 442 (sun gear member) with the torque-transmitting mechanisms 460 and 468 engaged, as well as a brake-type clutch, if one is provided (not shown), on the input member 417 engaged. Torque may be provided to the output member 419 in this manner to launch the output member 419 (i.e., start rotation of the output member 419 from a stationary state), establishing electric-only launch.

The transmission 416 is operable in an electrically-variable operating mode in which the engine 412 provides power to node 436 (carrier member) and the electric motor 414 provides power to node 442 and 432 (sun gear members), and the clutches 460 and 468 are engaged to allow power flow paths through the node 442 and the node 482. Torque may be provided to the output member 419 in this manner to launch the output member 419, establishing combined friction and electric launch. A parallel hybrid operating mode may also be established by powering the electric motor 414 during any of the third, fourth, fifth, and sixth forward speed ratios discussed above. An electrically-variable operating mode may be established by releasing the torque-transmitting mechanism 462 and powering the electric motor 414 during any of the fixed reverse, first, second, seventh and eighth fixed forward speed ratios. The operating modes of the transmission 416 are set forth below in Table 5.

TABLE 5

| OPERATING MODE | ENGINE | ELECTRIC MOTOR | ENGAGED TORQUE-TRANSMITTING MECHANISMS AND CLUTCHES |
|---|---|---|---|
| Fixed Reverse Speed Ratio | On | Off | 462, 466, 468 |
| Fixed First Forward Speed Ratio | On | Off | 460, 462, 468 |
| Fixed Second Forward Speed Ratio | On | Off | 462, 464, 468 |
| Fixed Third Forward Speed Ratio | On | Off | 460, 464, 468 |
| Fixed Fourth Forward Speed Ratio | On | Off | 464, 466, 468 |
| Fixed Fifth Forward Speed Ratio | On | Off | 460, 466, 468 |
| Fixed Sixth Forward Speed Ratio | On | Off | 460, 464, 466 |
| Fixed Seventh Forward Speed Ratio | On | Off | 460, 462, 466 |
| Fixed Eighth Forward Speed Ratio | On | Off | 462, 464, 466 |
| Electric-Only Operating Mode | Off | On | 460, 468, brake on input member, if provided |
| Parallel Hybrid Operating Mode | On | On | 460, 464, 468; or 464, 466, 468; or 460, 466, 468; or 460, 464, 466 |
| Electrically-Variable Operating Mode | On | On | 466, 468; or 460, 468; or 464, 468; 460, 466; or 464, 466 |

In an alternative embodiment not shown, the motor 414 is connected to node 484 rather than node 482. With this embodiment, following the engagement schedule set forth in Table 5 will result in electrically-variable operating modes corresponding with the first-fifth fixed forward speed ratios in Table 5 by releasing torque-transmitting mechanism 468 and powering the electric motor 414. A parallel hybrid operating mode may be established by powering the electric motor 414 during any of the sixth-eighth fixed forward speed ratios in Table 5.

Figure 7:
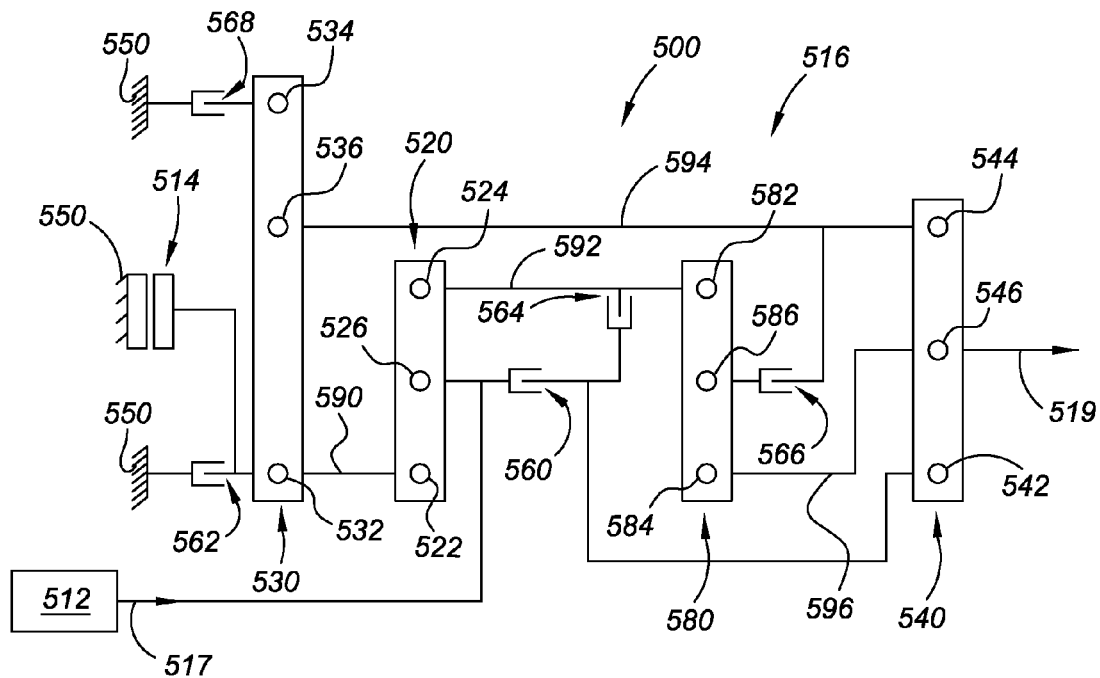
FIG. 7 is a schematic illustration in lever diagram form of a sixth embodiment of a hybrid transmission within the scope of the invention having eight fixed speed ratios.

Referring now to FIG. 7, another embodiment of a powertrain 500 is illustrated that includes a transmission 516 illustrated in lever diagram form operatively connected to an engine 512, such as an internal combustion engine, and an electric motor 514 operatively connected to the transmission 516, which is arranged to operate as an automatic eight-speed transmission in the absence of the electric motor 514. That is, the hybrid transmission 516 is a modification of an eight-speed automatic transmission that enables operation as a power-split hybrid transmission by the addition of an electric motor 514 at a selectively grounded sun gear member.

The transmission 516 includes an input member 517 and an output member 519. The transmission 516 includes four single-pinion planetary gear sets (i.e., a first, a second, a third, and a fourth planetary gear set) represented in lever diagram form as levers 520, 530, 540 and 580, respectively. Lever 520 includes nodes 522, 524 and 526 that represent a sun gear member, a ring gear member and a carrier member, respectively. Lever 530 includes nodes 532, 534 and 536 that represent a sun gear member, a ring gear member and a carrier member, respectively. Lever 540 includes nodes 542, 544 and 546 that represent a sun gear member, a ring gear member and a carrier member, respectively. Lever 580 includes nodes 582, 584 and 586 representing a sun gear member, a ring gear member, and a carrier member, respectively.

An interconnecting member 590 continuously connects node 522 for common rotation with node 532. An interconnecting member 592 continuously connects node 524 for common rotation with the node 582. An interconnecting member 594 continuously connects node 536 for common rotation with node 544. An interconnecting member 596 continuously connects node 584 for common rotation with node 546.

The transmission 516 includes several selectively engagable torque-transmitting mechanisms. Clutch 560 is a first torque-transmitting mechanism selectively engagable to connect the input member 517 for rotation with node 542. A brake-type clutch 562 is selectively engagable to ground nodes 532 and 522 to a stationary housing 550, which is a casing surrounding all of the planetary gear sets and torque-transmitting mechanisms of the transmission 516. The stationary housing 550 may be one or more components, including radially extending support members, integrally connected to form a casing generally encircling the transmission 516 and defining an outer periphery thereof, as is known. Clutch 564 is a third torque-transmitting mechanism selectively engagable to connect nodes 524 and 582 for common rotation with node 542. Clutch 566 is a fourth torque-transmitting mechanism selectively engagable to connect nodes 536 and 544 for common rotation with node 586. Brake-type clutch 568 is a fifth torque-transmitting mechanism selectively engagable to ground node 534 to the stationary housing 550. A friction brake-type clutch (not shown) may also be provided to selectively ground the input member 517 to the stationary housing 550 to provide reaction torque at the input member 517. The electric motor 514 is powered by energy stored in a battery (not shown) operatively connected to the electric motor 514 via a power inverter (not shown) to provide power to the electric motor 514 under the control of a controller (not shown), as is understood by those skilled in the art of transmission design.

When the engine 512 is on and the electric motor 514 is off, the transmission 516 is operable as an eight-speed automatic transmission. A fixed reverse speed ratio is achieved by engaging torque-transmitting mechanisms 562, 566 and 568. A first fixed forward speed ratio is achieved by engaging torque-transmitting mechanisms 560, 562 and 568. A second fixed forward speed ratio is achieved by engaging torque-transmitting mechanisms 562, 564 and 568. A third fixed forward speed ratio is achieved by engaging torque-transmitting mechanisms 560, 564 and 568. A fourth fixed forward speed ratio is achieved by engaging torque-transmitting mechanisms 564, 566 and 568. A fifth fixed forward speed ratio is achieved by engaging torque-transmitting mechanisms 560, 566 and 568. A sixth fixed forward speed ratio is achieved by engaging torque-transmitting mechanisms 560, 564 and 566. A seventh fixed forward speed ratio is achieved by engaging torque-transmitting mechanisms 560, 562, and 566. An eighth fixed forward speed ratio is achieved by engaging torque-transmitting mechanisms 562, 564 and 566. Each of these fixed forward speed ratios are engine-only operating modes, as the electric motor 514 is off, and only the engine 512 provides power to the output member 519 though the planetary gear sets represented by levers 520, 530, 540 and 580. Torque may be provided to the output member 519 in this manner with torque-transmitting mechanisms 560, 562, and 568 engaged to establish friction launch of the output member 519.

The transmission 516 is also operable to provide an electric-only operating mode. In this operating mode, the engine 512 is off, and only the electric motor 514 is powering node 532 (sun gear member) with the torque-transmitting mechanisms 560 and 568 engaged, as well as a brake-type clutch, if one is provided, (not shown) on the input member 517 engaged. Torque may be provided to the output member 519 in this manner to launch the output member 519 (i.e., start rotation of the output member 519 from a stationary state), establishing electric-only launch.

The transmission 516 is operable in an electrically-variable operating mode in which the engine 512 provides power to node 526 (carrier member) and the electric motor 514 provides power to node 532 and 532 (sun gear members), and the clutches 560 and 568 are engaged to allow power flow paths through the node 542 and the node 532. Torque may be provided to the output member 519 in this manner to launch the output member 519, establishing combined friction and electric launch. A parallel hybrid operating mode may also be established by powering the electric motor 514 during any of the third, fourth, fifth, and sixth forward speed ratios discussed above. An electrically-variable operating mode may be established by releasing the torque-transmitting mechanism 562 and powering the electric motor 514 during any of the fixed reverse, first, second, seventh and eighth fixed forward speed ratios. The operating modes of the transmission 516 are set forth below in Table 6.

TABLE 6

| OPERATING MODE | ENGINE | ELECTRIC MOTOR | ENGAGED TORQUE-TRANSMITTING MECHANISMS AND CLUTCHES |
|---|---|---|---|
| Fixed Reverse Speed Ratio | On | Off | 562, 566, 568 |
| Fixed First Forward Speed Ratio | On | Off | 560, 562, 568 |
| Fixed Second Forward Speed Ratio | On | Off | 562, 564, 568 |
| Fixed Third Forward Speed Ratio | On | Off | 560, 564, 568 |
| Fixed Fourth Forward Speed Ratio | On | Off | 564, 566, 568 |
| Fixed Fifth Forward Speed Ratio | On | Off | 560, 566, 568 |
| Fixed Sixth Forward Speed Ratio | On | Off | 560, 564, 566 |
| Fixed Seventh Forward Speed Ratio | On | Off | 560, 562, 566 |
| Fixed Eighth Forward Speed Ratio | On | Off | 562, 564, 566 |
| Electric-Only Operating Mode | Off | On | 560, 568, brake on input member, if provided |
| Parallel Hybrid Operating Mode | On | On | 560, 564, 568; or 564, 566, 568; or 560, 566, 568; or 560, 564, 566 |
| Electrically-Variable Operating Mode | On | On | 566, 568; or 560, 568; or 564, 568; 560, 566; or 564, 566 |

In an alternative embodiment not shown, the motor 514 is connected to node 534 rather than node 532. With this embodiment, following the engagement schedule set forth in Table 6 will result in electrically-variable operating modes corresponding with the first-fifth fixed forward speed ratios in Table 6 by releasing torque-transmitting mechanism 568 and powering the electric motor 514. A parallel hybrid operating mode may be established by powering the electric motor 514 during any of the sixth-eighth fixed forward speed ratios in Table 6.

Figure 8:
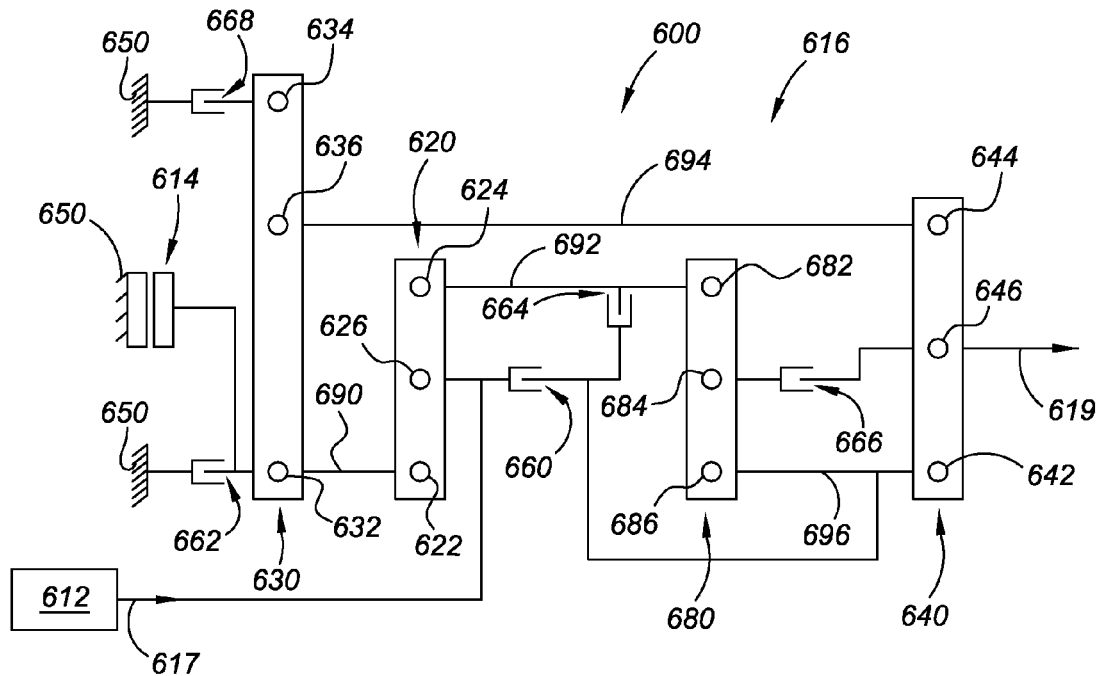
FIG. 8 is a schematic illustration in lever diagram form of a seventh embodiment of a hybrid transmission within the scope of the invention having eight fixed speed ratios.

Referring now to FIG. 8, another embodiment of a powertrain 600 is illustrated that includes a transmission 616 illustrated in lever diagram form operatively connected to an engine 612, such as an internal combustion engine, and an electric motor 614 operatively connected to the transmission 616, which is arranged to operate as an automatic eight-speed transmission in the absence of the electric motor 614. That is, the hybrid transmission 616 is a modification of an eight-speed automatic transmission that enables operation as a power-split hybrid transmission by the addition of an electric motor 614 at a selectively grounded sun gear member.

The transmission 616 includes an input member 617 and an output member 619. The transmission 616 includes three single-pinion and one double-pinion planetary gear sets (i.e., a first, a second, a third, and a fourth planetary gear set) represented in lever diagram form as levers 620, 630, 640 and 680. Lever 620 includes nodes 622, 624 and 626 that represent a sun gear member, a ring gear member and a carrier member, respectively. Lever 630 includes nodes 632, 634 and 636 that represent a sun gear member, a ring gear member and a carrier member, respectively. Lever 640 includes nodes 642, 644 and 646 that represent a sun gear member, a ring gear member and a carrier member, respectively. Lever 680 includes nodes 682, 684 and 686 representing a sun gear member, a ring gear member, and a carrier member, respectively. As will be apparent to those skilled in the art, lever 680 represents a double-pinion gear set.

An interconnecting member 690 continuously connects node 622 for common rotation with node 632. An interconnecting member 692 continuously connects node 624 for common rotation with the node 682. An interconnecting member 694 continuously connects node 636 for common rotation with node 634. An interconnecting member 696 continuously connects node 686 for common rotation with node 642.

The transmission 616 includes several selectively engagable torque-transmitting mechanisms. Clutch 660 is a first torque-transmitting mechanism selectively engagable to connect the input member 617 for rotation with nodes 686 and 642. A brake-type clutch 662 is selectively engagable to ground nodes 632 and 622 to a stationary housing 650, which is a casing surrounding all of the planetary gear sets and torque-transmitting mechanisms of the transmission 616. The stationary housing 650 may be one or more components, including radially extending support members, integrally connected to form a casing generally encircling the transmission 616 and defining an outer periphery thereof, as is known. Clutch 664 is a third torque-transmitting mechanism selectively engagable to connect nodes 624 and 682 for common rotation with nodes 642 and 686. Clutch 666 is a fourth torque-transmitting mechanism selectively engagable to connect node 646 for common rotation with node 686. Brake-type clutch 668 is a fifth torque-transmitting mechanism selectively engagable to ground node 634 to the stationary housing 650. A friction brake-type clutch (not shown) may also be provided to selectively ground the input member 617 to the stationary housing 650 to provide reaction torque at the input member 617. The electric motor 614 is powered by energy stored in a battery (not shown) operatively connected to the electric motor 614 via a power inverter (not shown) to provide power to the electric motor 614 under the control of a controller (not shown), as is understood by those skilled in the art of transmission design.

When the engine 612 is on and the electric motor 614 is off, the transmission 616 is operable as an eight-speed automatic transmission. A fixed reverse speed ratio is achieved by engaging torque-transmitting mechanisms 662, 666 and 668. A first fixed forward speed ratio is achieved by engaging torque-transmitting mechanisms 660, 662 and 668. A second fixed forward speed ratio is achieved by engaging torque-transmitting mechanisms 662, 664 and 668. A third fixed forward speed ratio is achieved by engaging torque-transmitting mechanisms 660, 664 and 668. A fourth fixed forward speed ratio is achieved by engaging torque-transmitting mechanisms 664, 666 and 668. A fifth fixed forward speed ratio is achieved by engaging torque-transmitting mechanisms 660, 666 and 668. A sixth fixed forward speed ratio is achieved by engaging torque-transmitting mechanisms 660, 664 and 666. A seventh fixed forward speed ratio is achieved by engaging torque-transmitting mechanisms 660, 662, and 666. An eighth fixed forward speed ratio is achieved by engaging torque-transmitting mechanisms 662, 664 and 666. Each of these fixed forward speed ratios are engine-only operating modes, as the electric motor 614 is off, and only the engine 612 provides power to the output member 619 though the planetary gear sets represented by levers 620, 630, 640 and 680. Torque may be provided to the output member 619 in this manner with torque-transmitting mechanisms 660, 662, and 668 engaged to establish friction launch of the output member 619.

The transmission 616 is also operable to provide an electric-only operating mode. In this operating mode, the engine 612 is off, and only the electric motor 614 is powering the node 632 (sun gear member) with the torque-transmitting mechanisms 660 and 668 engaged, as well as a brake-type clutch, if one is provided, (not shown) on the input member 617 engaged. Torque may be provided to the output member 619 in this manner to launch the output member 619 (i.e., start rotation of the output member 619 from a stationary state), establishing electric-only launch.

The transmission 616 is operable in an electrically-variable operating mode in which the engine 612 provides power to node 626 (carrier member) and the electric motor 614 provides power to nodes 622 and 632 (sun gear members), and the clutches 660 and 668 are engaged to allow power flow paths through the node 642 and the node 632. Torque may be provided to the output member 619 in this manner to launch the output member 619, establishing combined friction and electric launch. A parallel hybrid operating mode may also be established by powering the electric motor 614 during any of the third, fourth, fifth, and sixth forward speed ratios discussed above. An electrically-variable operating mode may be established by releasing the torque-transmitting mechanism 662 and powering the electric motor 614 during any of the fixed reverse, first, second, seventh and eighth fixed forward speed ratios. The operating modes of the transmission 616 are set forth below in Table 7.

TABLE 7

| OPERATING MODE | ENGINE | ELECTRIC MOTOR | ENGAGED TORQUE-TRANSMITTING MECHANISMS AND CLUTCHES |
|---|---|---|---|
| Fixed Reverse Speed Ratio | On | Off | 662, 666, 668 |
| Fixed First Forward Speed Ratio | On | Off | 660, 662, 668 |
| Fixed Second Forward Speed Ratio | On | Off | 662, 664, 668 |
| Fixed Third Forward Speed Ratio | On | Off | 660, 664, 668 |
| Fixed Fourth Forward Speed Ratio | On | Off | 664, 666, 668 |
| Fixed Fifth Forward Speed Ratio | On | Off | 660, 666, 668 |
| Fixed Sixth Forward Speed Ratio | On | Off | 660, 664, 666 |
| Fixed Seventh Forward Speed Ratio | On | Off | 660, 662, 666 |
| Fixed Eighth Forward Speed Ratio | On | Off | 662, 664, 666 |
| Electric-Only Operating Mode | Off | On | 660, 668, brake on input member, if provided |
| Parallel Hybrid Operating Mode | On | On | 660, 664, 668; or 664, 666, 668; or 660, 666, 668; or 660, 664, 666 |
| Electrically-Variable Operating Mode | On | On | 666, 668; or 660, 668; or 664, 668; 660, 666; or 664, 666 |

In an alternative embodiment not shown, the motor 614 is connected to node 634 rather than node 632. With this embodiment, following the engagement schedule set forth in Table 7 will result in electrically-variable operating modes corresponding with the first-fifth fixed forward speed ratios in Table 7 by releasing torque-transmitting mechanism 668 and powering the electric motor 614. A parallel hybrid operating mode may be established by powering the electric motor 614 during any of the sixth-eighth fixed forward speed ratios in Table 7.

Figure 9:
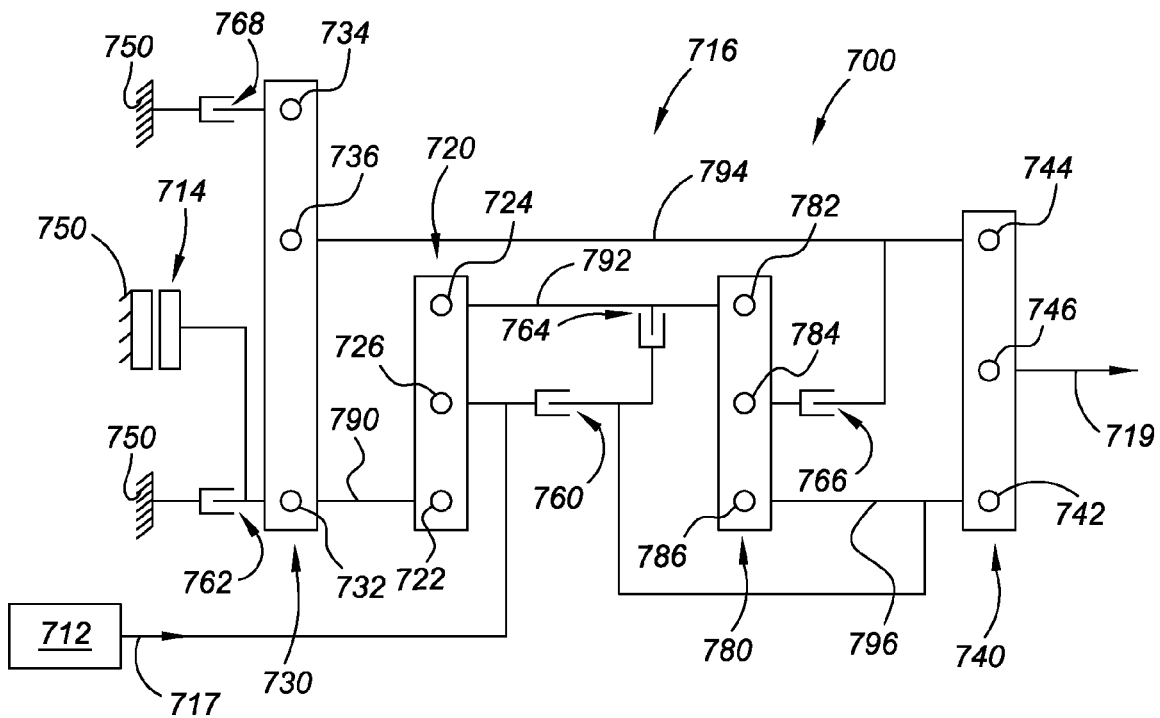
FIG. 9 is a schematic illustration in lever diagram form of an eighth embodiment of a hybrid transmission within the scope of the invention having eight fixed speed ratios.

Referring now to FIG. 9, another embodiment of a powertrain 700 is illustrated that includes a transmission 716 illustrated in lever diagram form operatively connected to an engine 712, such as an internal combustion engine, and an electric motor 714 operatively connected to the transmission 716, which is arranged to operate as an automatic eight-speed transmission in the absence of the electric motor 714. That is, the hybrid transmission 716 is a modification of an eight-speed automatic transmission that enables operation as a power-split hybrid transmission by the addition of an electric motor 714 at a selectively grounded sun gear member.

The transmission 716 includes an input member 717 and an output member 719. The transmission 716 includes three single-pinion and one double-pinion planetary gear sets (i.e., a first, a second, a third, and a fourth planetary gear set) represented in lever diagram form as levers 720, 730, 740 and 780. Lever 720 includes nodes 722, 724 and 726 that represent a sun gear member, a ring gear member and a carrier member, respectively. Lever 730 includes nodes 732, 734 and 736 that represent a sun gear member, a ring gear member and a carrier member, respectively. Lever 740 includes nodes 742, 744 and 746 that represent a sun gear member, a ring gear member and a carrier member, respectively. Lever 780 includes nodes 782, 784 and 786 representing a sun gear member, a ring gear member, and a carrier member, respectively. As will be apparent to those skilled in the art, lever 780 represents a double-pinion gear set.

An interconnecting member 790 continuously connects node 722 for common rotation with node 732. An interconnecting member 792 continuously connects node 724 for common rotation with the node 782. An interconnecting member 794 continuously connects node 736 for common rotation with node 744. An interconnecting member 796 continuously connects node 786 for common rotation with node 742.

The transmission 716 includes several selectively engagable torque-transmitting mechanisms. Clutch 760 is a first torque-transmitting mechanism selectively engagable to connect the input member 717 for rotation with nodes 786 and 742. A brake-type clutch 762 is selectively engagable to ground nodes 732 and 722 to a stationary housing 750, which is a casing surrounding all of the planetary gear sets and torque-transmitting mechanisms of the transmission 716. The stationary housing 750 may be one or more components, including radially extending support members, integrally connected to form a casing generally encircling the transmission 716 and defining an outer periphery thereof, as is known. Clutch 764 is a third torque-transmitting mechanism selectively engagable to connect nodes 724 and 782 for common rotation with nodes 742 and 786. Clutch 766 is a fourth torque-transmitting mechanism selectively engagable to connect nodes 736 and 744 for common rotation with node 784. Brake-type clutch 768 is a fifth torque-transmitting mechanism selectively engagable to ground node 734 to the stationary housing 750. A friction brake-type clutch (not shown) may also be provided to selectively ground the input member 717 to the stationary housing 750 to provide reaction torque at the input member 717. The electric motor 714 is powered by energy stored in a battery (not shown) operatively connected to the electric motor 714 via a power inverter (not shown) to provide power to the electric motor 714 under the control of a controller (not shown), as is understood by those skilled in the art of transmission design.

When the engine 712 is on and the electric motor 714 is off, the transmission 716 is operable as an eight-speed automatic transmission. A fixed reverse speed ratio is achieved by engaging torque-transmitting mechanisms 762, 766 and 768. A first fixed forward speed ratio is achieved by engaging torque-transmitting mechanisms 760, 762 and 768. A second fixed forward speed ratio is achieved by engaging torque-transmitting mechanisms 762, 764 and 768. A third fixed forward speed ratio is achieved by engaging torque-transmitting mechanisms 760, 764 and 768. A fourth fixed forward speed ratio is achieved by engaging torque-transmitting mechanisms 764, 766 and 768. A fifth fixed forward speed ratio is achieved by engaging torque-transmitting mechanisms 760, 766 and 768. A sixth fixed forward speed ratio is achieved by engaging torque-transmitting mechanisms 760, 764 and 766. A seventh fixed forward speed ratio is achieved by engaging torque-transmitting mechanisms 760, 762, and 766. An eighth fixed forward speed ratio is achieved by engaging torque-transmitting mechanisms 762, 764 and 766. Each of these fixed forward speed ratios are engine-only operating modes, as the electric motor 714 is off, and only the engine 712 provides power to the output member 719 though the planetary gear sets represented by levers 720, 730, 740 and 780. Torque may be provided to the output member 719 in this manner with torque-transmitting mechanisms 760, 762, and 768 engaged to establish friction launch of the output member 719.

The transmission 716 is also operable to provide an electric-only operating mode. In this operating mode, the engine 712 is off, and only the electric motor 714 is powering the node 732 (sun gear member) with the torque-transmitting mechanisms 760 and 768 engaged, as well as a brake-type clutch, if one is provided (not shown), on the input member 717 engaged. Torque may be provided to the output member 719 in this manner to launch the output member 719 (i.e., start rotation of the output member 719 from a stationary state), establishing electric-only launch.

The transmission 716 is operable in an electrically-variable operating mode in which the engine 712 provides power to node 726 (carrier member) and the electric motor 714 provides power to nodes 722 and 732 (sun gear members), and the clutches 760 and 768 are engaged to allow power flow paths through the node 742 and the node 732. Torque may be provided to the output member 719 in this manner to launch the output member 719, establishing combined friction and electric launch. A parallel hybrid operating mode may also be established by powering the electric motor 714 during any of the third, fourth, fifth, and sixth forward speed ratios discussed above. An electrically-variable operating mode may be established by releasing the torque-transmitting mechanism 762 and powering the electric motor 714 during any of the fixed reverse, first, second, seventh and eighth fixed forward speed ratios. The operating modes of the transmission 716 are set forth below in Table 8.

TABLE 8

| OPERATING MODE | ENGINE | ELECTRIC MOTOR | ENGAGED TORQUE-TRANSMITTING MECHANISMS AND CLUTCHES |
|---|---|---|---|
| Fixed Reverse Speed Ratio | On | Off | 762, 766, 768 |
| Fixed First Forward Speed Ratio | On | Off | 760, 762, 768 |
| Fixed Second Forward Speed Ratio | On | Off | 762, 764, 768 |
| Fixed Third Forward Speed Ratio | On | Off | 760, 764, 768 |
| Fixed Fourth Forward Speed Ratio | On | Off | 764, 766, 768 |
| Fixed Fifth Forward Speed Ratio | On | Off | 760, 766, 768 |
| Fixed Sixth Forward Speed Ratio | On | Off | 760, 764, 766 |
| Fixed Seventh Forward Speed Ratio | On | Off | 760, 762, 766 |
| Fixed Eighth Forward Speed Ratio | On | Off | 762, 764, 766 |
| Electric-Only Operating Mode | Off | On | 760, 768, brake on input member, if provided |
| Parallel Hybrid Operating Mode | On | On | 760, 764, 768; or 764, 766, 768; or 760, 766, 768; or 760, 764, 766 |
| Electrically-Variable Operating Mode | On | On | 766, 768; or 760, 768; or 764, 768; or 760, 766; or 764, 766 |

In an alternative embodiment not shown, the motor 714 is connected to node 734 rather than node 732. With this embodiment, following the engagement schedule set forth in Table 8 will result in electrically-variable operating modes corresponding with the first-fifth fixed forward speed ratios in Table 8 by releasing torque-transmitting mechanism 768 and powering the electric motor 714. A parallel hybrid operating mode may be established by powering the electric motor 714 during any of the sixth-eighth fixed forward speed ratios in Table 8.

Figure 10:
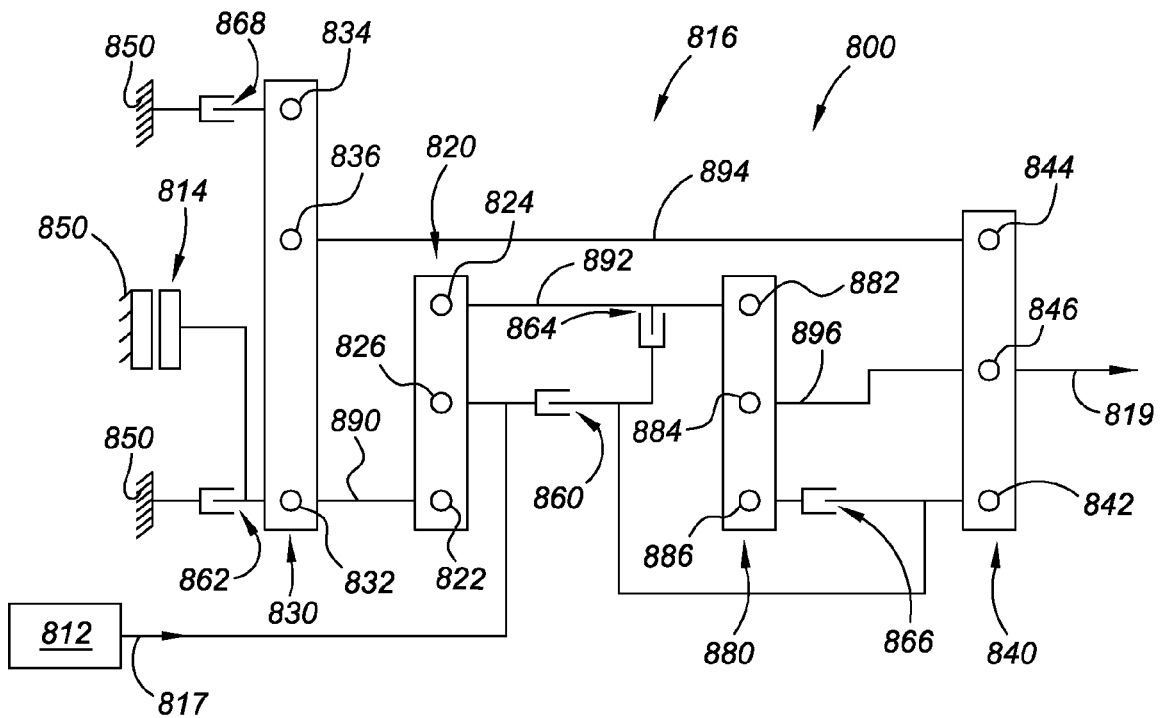
FIG. 10 is a schematic illustration in lever diagram form of a ninth embodiment of a hybrid transmission within the scope of the invention having eight fixed speed ratios.

Referring now to FIG. 10, another embodiment of a powertrain 800 is illustrated that includes a transmission 816 illustrated in lever diagram form operatively connected to an engine 812, such as an internal combustion engine, and an electric motor 814 operatively connected to the transmission 816, which is arranged to operate as an automatic eight-speed transmission in the absence of the electric motor 814. That is, the hybrid transmission 816 is a modification of an eight-speed automatic transmission that enables operation as a power-split hybrid transmission by the addition of an electric motor 814 at a selectively grounded sun gear member.

The transmission 816 includes an input member 817 and an output member 819. The transmission 816 includes three single-pinion and one double-pinion planetary gear sets (i.e., a first, a second, a third, and a fourth planetary gear set) represented in lever diagram form as levers 820, 830, 840 and 880. Lever 820 includes nodes 822, 824 and 826 that represent a sun gear member, a ring gear member and a carrier member, respectively. Lever 830 includes nodes 832, 834 and 836 that represent a sun gear member, a ring gear member and a carrier member, respectively. Lever 840 includes nodes 842, 844 and 846 that represent a sun gear member, a ring gear member and a carrier member, respectively. Lever 880 includes nodes 882, 884 and 886 representing a sun gear member, a ring gear member, and a carrier member, respectively. As will be apparent to those skilled in the art, lever 880 represents a double-pinion gear set.

An interconnecting member 890 continuously connects node 822 for common rotation with node 832. An interconnecting member 892 continuously connects node 824 for common rotation with the node 882. An interconnecting member 894 continuously connects node 836 for common rotation with node 844. An interconnecting member 896 continuously connects node 884 for common rotation with node 846.

The transmission 816 includes several selectively engagable torque-transmitting mechanisms. Clutch 860 is a first torque-transmitting mechanism selectively engagable to connect the input member 817 for rotation with node 842. A brake-type clutch 862 is selectively engagable to ground nodes 832 and 822 to a stationary housing 850, which is a casing surrounding all of the planetary gear sets and torque-transmitting mechanisms of the transmission 816. The stationary housing 850 may be one or more components, including radially extending support members, integrally connected to form a casing generally encircling the transmission 816 and defining an outer periphery thereof, as is known. Clutch 864 is a third torque-transmitting mechanism selectively engagable to connect nodes 824 and 882 for common rotation with node 842. Clutch 866 is a fourth torque-transmitting mechanism selectively engagable to connect node 886 for common rotation with node 842. Brake-type clutch 868 is a fifth torque-transmitting mechanism selectively engagable to ground node 834 to the stationary housing 850. A friction brake-type clutch (not shown) may also be provided to selectively ground the input member 817 to the stationary housing 850 to provide reaction torque at the input member 817. The electric motor 814 is powered by energy stored in a battery (not shown) operatively connected to the electric motor 814 via a power inverter (not shown) to provide power to the electric motor 814 under the control of a controller (not shown), as is understood by those skilled in the art of transmission design.

When the engine 812 is on and the electric motor 814 is off, the transmission 816 is operable as an eight-speed automatic transmission. A fixed reverse speed ratio is achieved by engaging torque-transmitting mechanisms 862, 866 and 868. A first fixed forward speed ratio is achieved by engaging torque-transmitting mechanisms 860, 862 and 868. A second fixed forward speed ratio is achieved by engaging torque-transmitting mechanisms 862, 864 and 868. A third fixed forward speed ratio is achieved by engaging torque-transmitting mechanisms 860, 864 and 868. A fourth fixed forward speed ratio is achieved by engaging torque-transmitting mechanisms 864, 866 and 868. A fifth fixed forward speed ratio is achieved by engaging torque-transmitting mechanisms 860, 866 and 868. A sixth fixed forward speed ratio is achieved by engaging torque-transmitting mechanisms 860, 864 and 866. A seventh fixed forward speed ratio is achieved by engaging torque-transmitting mechanisms 860, 862, and 866. An eighth fixed forward speed ratio is achieved by engaging torque-transmitting mechanisms 862, 864 and 866. Each of these fixed forward speed ratios are engine-only operating modes, as the electric motor 814 is off, and only the engine 812 provides power to the output member 819 though the planetary gear sets represented by levers 820, 830, 840 and 880. Torque may be provided to the output member 819 in this manner with torque-transmitting mechanisms 860, 862, and 868 engaged to establish friction launch of the output member 819.

The transmission 816 is also operable to provide an electric-only operating mode. In this operating mode, the engine 812 is off, and only the electric motor 814 is powering the node 832 (sun gear member) with the torque-transmitting mechanism 868 engaged, as well as a brake-type clutch, if one is provided (not shown), on the input member 817 engaged. Torque may be provided to the output member 819 in this manner to launch the output member 819 (i.e., start rotation of the output member 819 from a stationary state), establishing electric-only launch.

The transmission 816 is operable in an electrically-variable operating mode in which the engine 812 provides power to node 826 (carrier member) and the electric motor 814 provides power to nodes 822 and 832 (sun gear members), and the clutches 860 and 868 are engaged to allow power flow paths through the node 842 and the node 832. Torque may be provided to the output member 819 in this manner to launch the output member 819, establishing combined friction and electric launch. A parallel hybrid operating mode may also be established by powering the electric motor 814 during any of the third, fourth, fifth, and sixth forward speed ratios discussed above. An electrically-variable operating mode may be established by releasing the torque-transmitting mechanism 862 and powering the electric motor 814 during any of the fixed reverse, first, second, seventh and eighth fixed forward speed ratios. The operating modes of the transmission 816 are set forth below in Table 9.

TABLE 9

| OPERATING MODE | ENGINE | ELECTRIC MOTOR | ENGAGED TORQUE-TRANSMITTING MECHANISMS AND CLUTCHES |
|---|---|---|---|
| Fixed Reverse Speed Ratio | On | Off | 862, 866, 868 |
| Fixed First Forward Speed Ratio | On | Off | 860, 862, 868 |
| Fixed Second Forward Speed Ratio | On | Off | 862, 864, 868 |
| Fixed Third Forward Speed Ratio | On | Off | 860, 864, 868 |
| Fixed Fourth Forward Speed Ratio | On | Off | 864, 866, 868 |
| Fixed Fifth Forward Speed Ratio | On | Off | 860, 866, 868 |
| Fixed Sixth Forward Speed Ratio | On | Off | 860, 864, 866 |
| Fixed Seventh Forward Speed Ratio | On | Off | 860, 862, 866 |
| Fixed Eighth Forward Speed Ratio | On | Off | 862, 864, 866 |
| Electric-Only Operating Mode | Off | On | 860, 868, brake on input member, if provided |
| Parallel Hybrid Operating Mode | On | On | 860, 864, 868; or 864, 866, 868; or 860, 866, 868; or 860, 864, 866 |
| Electrically-Variable Operating Mode | On | On | 866, 868; or 860, 868; or 864, 868; 860, 866; or 864, 866 |

In an alternative embodiment not shown, the motor 814 is connected to node 834 rather than node 832. With this embodiment, following the engagement schedule set forth in Table 9 will result in electrically-variable operating modes corresponding with the first-fifth fixed forward speed ratios in Table 9 by releasing torque-transmitting mechanism 868 and powering the electric motor 814. A parallel hybrid operating mode may be established by powering the electric motor 814 during any of the sixth-eighth fixed forward speed ratios in Table 9.

Figure 11:
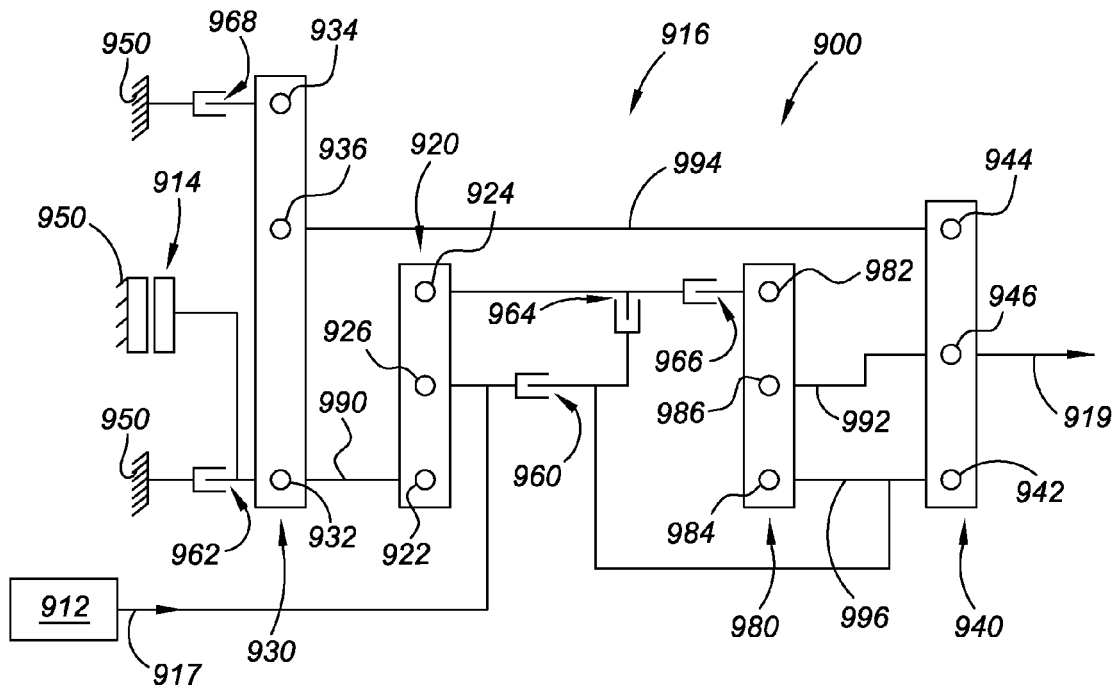
FIG. 11 is a schematic illustration in lever diagram form of a tenth embodiment of a hybrid transmission within the scope of the invention having eight fixed speed ratios.

Referring now to FIG. 11, another embodiment of a powertrain 900 is illustrated that includes a transmission 916 illustrated in lever diagram form operatively connected to an engine 912, such as an internal combustion engine, and an electric motor 914 operatively connected to the transmission 916, which is arranged to operate as an automatic eight-speed transmission in the absence of the electric motor 914. That is, the hybrid transmission 916 is a modification of an eight-speed automatic transmission that enables operation as a power-split hybrid transmission by the addition of an electric motor 914 at a selectively grounded sun gear member.

The transmission 916 includes an input member 917 and an output member 919. The transmission 916 includes four single-pinion planetary gear sets (i.e., a first, a second, a third, and a fourth planetary gear set) represented in lever diagram form as levers 920, 930, 940 and 980. Lever 920 includes nodes 922, 924 and 926 that represent a sun gear member, a ring gear member and a carrier member, respectively. Lever 930 includes nodes 932, 934 and 936 that represent a sun gear member, a ring gear member and a carrier member, respectively. Lever 940 includes nodes 942, 944 and 946 that represent a sun gear member, a ring gear member and a carrier member, respectively. Lever 980 includes nodes 982, 984 and 986 representing a sun gear member, a ring gear member, and a carrier member, respectively.

An interconnecting member 990 continuously connects node 922 for common rotation with node 932. An interconnecting member 992 continuously connects node 986 for common rotation with the node 946. An interconnecting member 994 continuously connects node 936 for common rotation with node 944. An interconnecting member 996 continuously connects node 984 for common rotation with node 942.

The transmission 916 includes several selectively engagable torque-transmitting mechanisms. Clutch 960 is a first torque-transmitting mechanism selectively engagable to connect the input member 917 for rotation with nodes 984 and 942. A brake-type clutch 962 is selectively engagable to ground nodes 932 and 922 to a stationary housing 950, which is a casing surrounding all of the planetary gear sets and torque-transmitting mechanisms of the transmission 916. The stationary housing 950 may be one or more components, including radially extending support members, integrally connected to form a casing generally encircling the transmission 916 and defining an outer periphery thereof, as is known. Clutch 964 is a third torque-transmitting mechanism selectively engagable to connect nodes 924 and 982 for common rotation with nodes 984 and 942. Clutch 966 is a fourth torque-transmitting mechanism selectively engagable to connect node 924 for common rotation with node 982. Brake-type clutch 968 is a fifth torque-transmitting mechanism selectively engagable to ground node 934 to the stationary housing 950. A friction brake-type clutch (not shown) may also be provided to selectively ground the input member 917 to the stationary housing 950 to provide reaction torque at the input member 917. The electric motor 914 is powered by energy stored in a battery (not shown) operatively connected to the electric motor 914 via a power inverter (not shown) to provide power to the electric motor 914 under the control of a controller (not shown), as is understood by those skilled in the art of transmission design.

When the engine 912 is on and the electric motor 914 is off, the transmission 916 is operable as an eight-speed automatic transmission. A fixed reverse speed ratio is achieved by engaging torque-transmitting mechanisms 962, 966 and 968. A first fixed forward speed ratio is achieved by engaging torque-transmitting mechanisms 960, 962 and 968. A second fixed forward speed ratio is achieved by engaging torque-transmitting mechanisms 962, 964 and 968. A third fixed forward speed ratio is achieved by engaging torque-transmitting mechanisms 960, 964 and 968. A fourth fixed forward speed ratio is achieved by engaging torque-transmitting mechanisms 964, 966 and 968. A fifth fixed forward speed ratio is achieved by engaging torque-transmitting mechanisms 960, 966 and 968. A sixth fixed forward speed ratio is achieved by engaging torque-transmitting mechanisms 960, 964 and 966. A seventh fixed forward speed ratio is achieved by engaging torque-transmitting mechanisms 960, 962, and 966. An eighth fixed forward speed ratio is achieved by engaging torque-transmitting mechanisms 962, 964 and 966. Each of these fixed forward speed ratios are engine-only operating modes, as the electric motor 914 is off, and only the engine 912 provides power to the output member 919 though the planetary gear sets represented by levers 920, 930, 940 and 980. Torque may be provided to the output member 919 in this manner with torque-transmitting mechanisms 960, 962, and 968 engaged to establish friction launch of the output member 919.

The transmission 916 is also operable to provide an electric-only operating mode. In this operating mode, the engine 912 is off, and only the electric motor 914 is powering the node 932 (sun gear member) with the torque-transmitting mechanisms 960 and 968 engaged, as well as a brake-type clutch, if one is provided (not shown), on the input member 917 engaged. Torque may be provided to the output member 919 in this manner to launch the output member 919 (i.e., start rotation of the output member 919 from a stationary state), establishing electric-only launch.

The transmission 916 is operable in an electrically-variable operating mode in which the engine 912 provides power to node 926 (carrier member) and the electric motor 914 provides power to nodes 932 and 932 (sun gear members), and the clutches 960 and 968 are engaged to allow power flow paths through the node 942 and the node 932. Torque may be provided to the output member 919 in this manner to launch the output member 919, establishing combined friction and electric launch. A parallel hybrid operating mode may also be established by powering the electric motor 914 during any of the third, fourth, fifth, and sixth forward speed ratios discussed above. An electrically-variable operating mode may be established by releasing the torque-transmitting mechanism 962 and powering the electric motor 914 during any of the fixed reverse, first, second, seventh and eighth fixed forward speed ratios. The operating modes of the transmission 316 are set forth below in Table 10.

TABLE 10

| OPERATING MODE | ENGINE | ELECTRIC MOTOR | ENGAGED TORQUE-TRANSMITTING MECHANISMS AND CLUTCHES |
|---|---|---|---|
| Fixed Reverse Speed Ratio | On | Off | 962, 966, 968 |
| Fixed First Forward Speed Ratio | On | Off | 960, 962, 968 |
| Fixed Second Forward Speed Ratio | On | Off | 962, 964, 968 |
| Fixed Third Forward Speed Ratio | On | Off | 960, 964, 968 |
| Fixed Fourth Forward Speed Ratio | On | Off | 964, 966, 968 |
| Fixed Fifth Forward Speed Ratio | On | Off | 960, 966, 968 |
| Fixed Sixth Forward Speed Ratio | On | Off | 360, 364, 366 |
| Fixed Seventh Forward Speed Ratio | On | Off | 960, 962, 966 |
| Fixed Eighth Forward Speed Ratio | On | Off | 962, 964, 966 |
| Electric-Only Operating Mode | Off | On | 960, 968, brake on input member, if provided |
| Parallel Hybrid Operating Mode | On | On | 960, 964, 968; or 964, 966, 968; or 960, 966, 968; or 960, 964, 966 |
| Electrically-Variable Operating Mode | On | On | 966, 968; or 960, 968; or 964, 968; 960, 966; or 964, 966 |

In an alternative embodiment not shown, the motor 914 is connected to node 934 rather than node 932. With this embodiment, following the engagement schedule set forth in Table 10 will result in electrically-variable operating modes corresponding with the first-fifth fixed forward speed ratios in Table 10 by releasing torque-transmitting mechanism 968 and powering the electric motor 914. A parallel hybrid operating mode may be established by powering the electric motor 914 during any of the sixth-eighth fixed forward speed ratios in Table 10.

Figure 12:
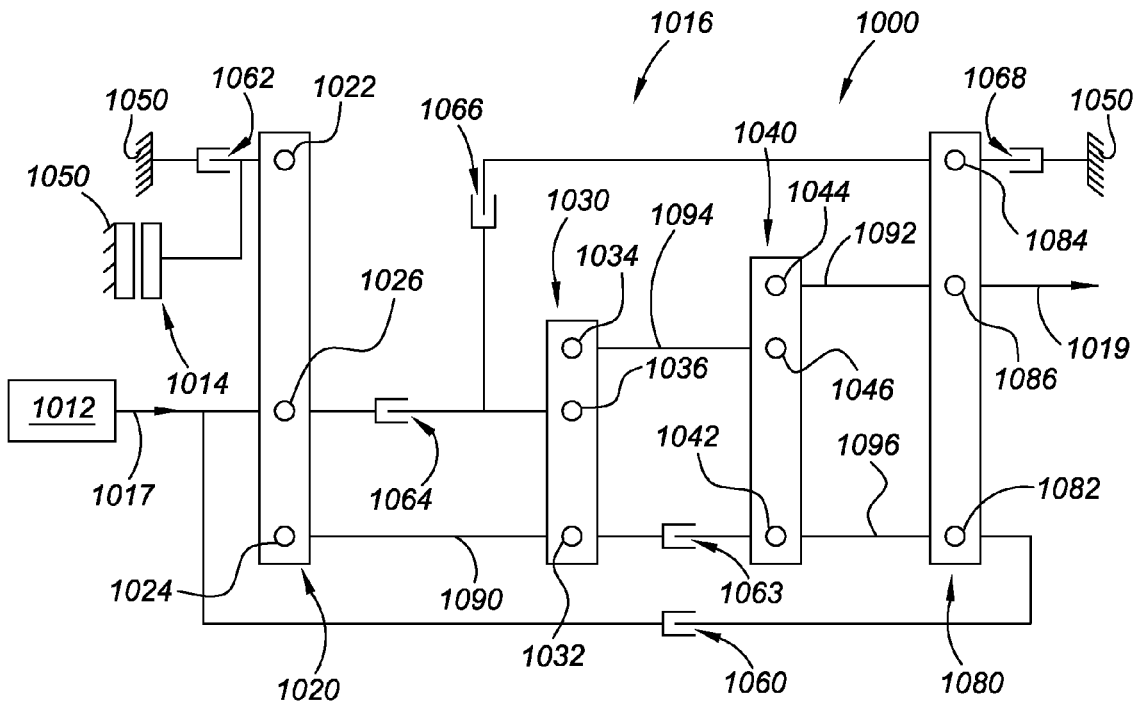
FIG. 12 is a schematic illustration in lever diagram form of an eleventh embodiment of a hybrid transmission within the scope of the invention having eight fixed speed ratios.

Referring now to FIG. 12, another embodiment of a powertrain 1000 is illustrated that includes a transmission 1016 illustrated in lever diagram form operatively connected to an engine 1012, such as an internal combustion engine, and an electric motor 1014 operatively connected to the transmission 1016, which is arranged to operate as an automatic eight-speed transmission in the absence of the electric motor 1014. That is, the hybrid transmission 1016 is a modification of an eight-speed automatic transmission that enables operation as a power-split hybrid transmission by the addition of an electric motor 1014 at a selectively grounded sun gear member.

The transmission 1016 includes an input member 1017 and an output member 1019. The transmission 1016 includes four single-pinion planetary gear sets (i.e., a first, a second, a third, and a fourth planetary gear set) represented in lever diagram form as levers 1020, 1030, 1040 and 1080. Lever 1020 includes nodes 1022, 1024 and 1026 that represent a sun gear member, a ring gear member and a carrier member, respectively. Lever 1030 includes nodes 1032, 1034 and 1036 that represent a sun gear member, a ring gear member and a carrier member, respectively. Lever 1040 includes nodes 1042, 1044 and 1046 that represent a sun gear member, a ring gear member and a carrier member, respectively. Lever 1080 includes nodes 1082, 1084 and 1086 representing a sun gear member, a ring gear member, and a carrier member, respectively.

An interconnecting member 1090 continuously connects node 1024 for common rotation with node 1032. An interconnecting member 1092 continuously connects node 1086 for common rotation with the node 1044. An interconnecting member 1094 continuously connects node 1034 for common rotation with node 1044. An interconnecting member 1096 continuously connects node 1042 for common rotation with node 1082.

The transmission 1016 includes several selectively engagable torque-transmitting mechanisms. Clutch 1060 is a first torque-transmitting mechanism selectively engagable to connect the input member 1017 for rotation with nodes 1082 and 1042. A brake-type clutch 1062 is selectively engagable to ground node 1022 to a stationary housing 1050, which is a casing surrounding all of the planetary gear sets and torque-transmitting mechanisms of the transmission 1016. The stationary housing 1050 may be one or more components, including radially extending support members, integrally connected to form a casing generally encircling the transmission 1016 and defining an outer periphery thereof, as is known. Clutch 1064 is a third torque-transmitting mechanism selectively engagable to connect node 1026 for common rotation with node 1036. Clutch 1066 is a fourth torque-transmitting mechanism selectively engagable to connect node 1084 for common rotation with node 1036. Brake-type clutch 1068 is a fifth torque-transmitting mechanism selectively engagable to ground node 1084 to the stationary housing 1050. Clutch 1063 is a sixth torque-transmitting mechanism selectively engagable to connect node 1032 for common rotation with node 1042. A friction brake-type clutch (not shown) may also be provided to selectively ground the input member 1017 to the stationary housing 1050 to provide reaction torque at the input member 1017. The electric motor 1014 is powered by energy stored in a battery (not shown) operatively connected to the electric motor 1014 via a power inverter (not shown) to provide power to the electric motor 1014 under the control of a controller (not shown), as is understood by those skilled in the art of transmission design.

When the engine 1012 is on and the electric motor 1014 is off, the transmission 1016 is operable as an eight-speed automatic transmission. A fixed reverse speed ratio is achieved by engaging torque-transmitting mechanisms 1062, 1066 and 1068. A first fixed forward speed ratio is achieved by engaging torque-transmitting mechanisms 1060, 1062 and 1068. A second fixed forward speed ratio is achieved by engaging torque-transmitting mechanisms 1062, 1063 and 1068. A third fixed forward speed ratio is achieved by engaging torque-transmitting mechanisms 1062, 1064 and 1068. A fourth fixed forward speed ratio is achieved by engaging torque-transmitting mechanisms 1062, 1064, and 1063. A fifth fixed forward speed ratio is achieved by engaging torque-transmitting mechanisms 1060, 1062 and 1064. A sixth fixed forward speed ratio is achieved by engaging torque-transmitting mechanisms 1062, 1064, and 1066. A seventh fixed forward speed ratio is achieved by engaging torque-transmitting mechanisms 1060, 1062, and 1066. An eighth fixed forward speed ratio is achieved by engaging torque-transmitting mechanisms 1062, 1063 and 1066. Each of these fixed forward speed ratios are engine-only operating modes, as the electric motor 1014 is off, and only the engine 1012 provides power to the output member 1019 though the planetary gear sets represented by levers 1020, 1030, 1040 and 1080. Torque may be provided to the output member 1019 in this manner with torque-transmitting mechanisms 1060, 1062, and 1068 engaged to establish friction launch of the output member 1019.

The transmission 1016 is also operable to provide an electric-only operating mode. In this operating mode, the engine 1012 is off, and only the electric motor 1014 is powering the node 1022 (sun gear member) with the torque-transmitting mechanisms 1060 and 1068 engaged, as well as a brake-type clutch, if one is provided (not shown), on the input member 1017 engaged. Torque may be provided to the output member 1019 in this manner to launch the output member 1019 (i.e., start rotation of the output member 1019 from a stationary state), establishing electric-only launch.

The transmission 1016 is operable in an electrically-variable operating mode in which the engine 1012 provides power to node 1026 (carrier member) and the electric motor 1014 provides power to node 1022 (sun gear member), and the clutch 1060 is engaged to allow power flow paths through the node 1022 and the node 1082. Torque may be provided to the output member 1019 in this manner to launch the output member 1019, establishing combined friction and electric launch. A parallel hybrid operating mode may also be established by powering the electric motor 1014 during any of the third, fourth, fifth, and sixth forward speed ratios discussed above. An electrically-variable operating mode may be established by releasing the torque-transmitting mechanism 1062 and powering the electric motor 1014 during any of the fixed reverse, first, second, seventh and eighth fixed forward speed ratios. The operating modes of the transmission 1016 are set forth below in Table 11.

TABLE 11

| OPERATING MODE | ENGINE | ELECTRIC MOTOR | ENGAGED TORQUE-TRANSMITTING MECHANISMS AND CLUTCHES |
|---|---|---|---|
| Fixed Reverse Speed Ratio | On | Off | 1062, 1066, 1068 |
| Fixed First Forward Speed Ratio | On | Off | 1060, 1062, 1068 |
| Fixed Second Forward Speed Ratio | On | Off | 1062, 1064, 1068 |
| Fixed Third Forward Speed Ratio | On | Off | 1060, 1064, 1068 |
| Fixed Fourth Forward Speed Ratio | On | Off | 1064, 1066, 1068 |
| Fixed Fifth Forward Speed Ratio | On | Off | 1060, 1066, 1068 |
| Fixed Sixth Forward Speed Ratio | On | Off | 1060, 1064, 1066 |
| Fixed Seventh Forward Speed Ratio | On | Off | 1060, 1062, 1066 |
| Fixed Eighth Forward Speed Ratio | On | Off | 1062, 1064, 1066 |
| Electric-Only Operating Mode | Off | On | 1060, 1068, brake on input member, if provided |
| Parallel Hybrid Operating Mode | On | On | 1060, 1064, 1068; or 1064, 1066, 1068; or 1060, 1066, 1068; or 1060, 1064, 1066 |
| Electrically-Variable Operating Mode | On | On | 1066, 1068; or 1060, 1068; or 1064, 1068; 1060, 1066; or 1064, 1066 |

Figure 13:
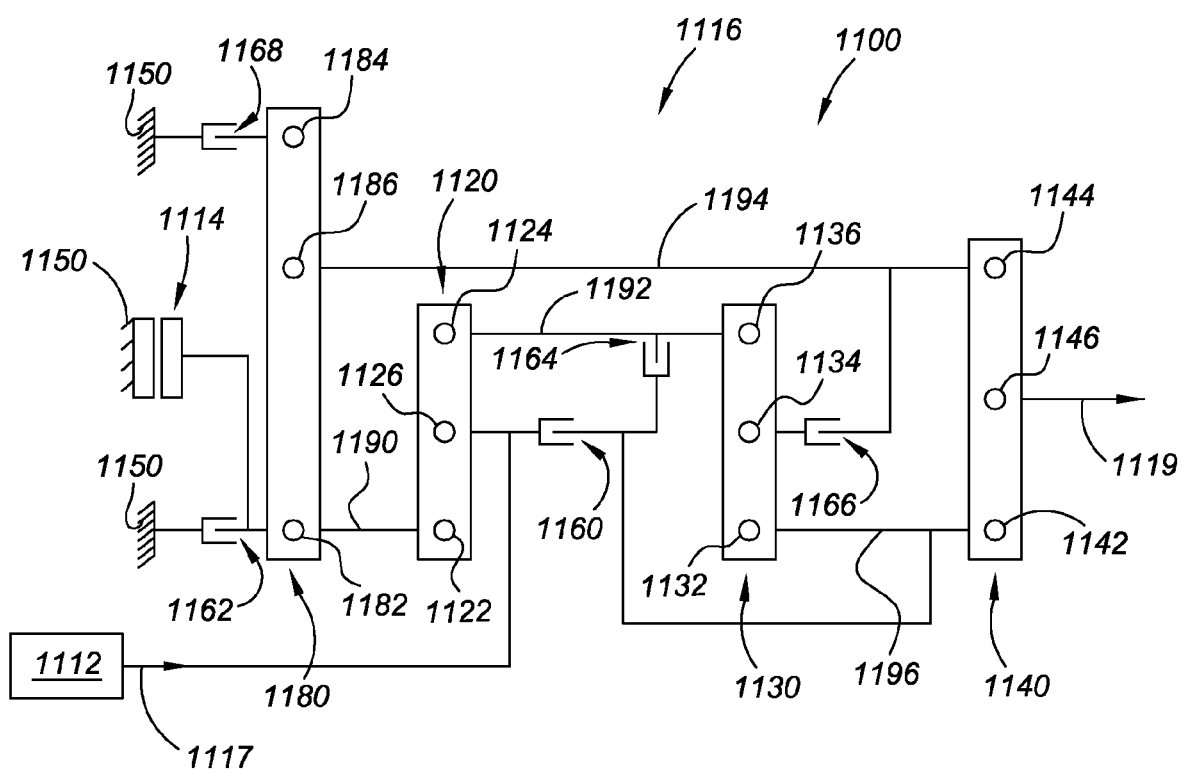
FIG. 13 is a schematic illustration in lever diagram form of a twelfth embodiment of a hybrid transmission within the scope of the invention having eight fixed speed ratios.

Referring now to FIG. 13, another embodiment of a powertrain 1100 is illustrated that includes a transmission 1116 illustrated in lever diagram form operatively connected to an engine 1112, such as an internal combustion engine, and an electric motor 1114 operatively connected to the transmission 1116, which is arranged to operate as an automatic eight-speed transmission in the absence of the electric motor 1114. That is, the hybrid transmission 1116 is a modification of an eight-speed automatic transmission that enables operation as a power-split hybrid transmission by the addition of an electric motor 1114 at a selectively grounded sun gear member.

The transmission 1116 includes an input member 1117 and an output member 1119. The transmission 1116 includes three single-pinion and one double-pinion planetary gear sets (i.e., a first, a second, a third, and a fourth planetary gear set) represented in lever diagram form as levers 1120, 1130, 1140 and 1180. Lever 1120 includes nodes 1122, 1124 and 1126 that represent a sun gear member, a ring gear member and a carrier member, respectively. Lever 1130 includes nodes 1132, 1134 and 1136 that represent a sun gear member, a ring gear member and a carrier member, respectively. As will be apparent to those skilled in the art, lever 1130 represents a double-pinion gear set. Lever 1140 includes nodes 1142, 1144 and 1146 that represent a sun gear member, a ring gear member and a carrier member, respectively. Lever 1180 includes nodes 1182, 1184 and 1186 representing a sun gear member, a ring gear member, and a carrier member, respectively.

An interconnecting member 1190 continuously connects node 1122 for common rotation with node 1182. An interconnecting member 1192 continuously connects node 1136 for common rotation with the node 1124. An interconnecting member 1194 continuously connects node 1186 for common rotation with node 1144. An interconnecting member 1196 continuously connects node 1132 for common rotation with node 1142.

The transmission 1116 includes several selectively engagable torque-transmitting mechanisms. Clutch 1160 is a first torque-transmitting mechanism selectively engagable to connect the input member 1117 for rotation with nodes 1132 and 1142. A brake-type clutch 1162 is selectively engagable to ground nodes 1122 and 1182 to a stationary housing 1150, which is a casing surrounding all of the planetary gear sets and torque-transmitting mechanisms of the transmission 1116. The stationary housing 1150 may be one or more components, including radially extending support members, integrally connected to form a casing generally encircling the transmission 1116 and defining an outer periphery thereof, as is known. Clutch 1164 is a third torque-transmitting mechanism selectively engagable to connect nodes 1124 and 1136 for common rotation with nodes 1132 and 1142. Clutch 1166 is a fourth torque-transmitting mechanism selectively engagable to connect nodes 1186 and 1144 for common rotation with node 1134. Brake-type clutch 1168 is a fifth torque-transmitting mechanism selectively engagable to ground node 1184 to the stationary housing 1150. A friction brake-type clutch (not shown) may also be provided to selectively ground the input member 1117 to the stationary housing 1150 to prevent provide reaction torque at the input member 1117. The electric motor 1114 is powered by energy stored in a battery (not shown) operatively connected to the electric motor 1114 via a power inverter (not shown) to provide power to the electric motor 1114 under the control of a controller (not shown), as is understood by those skilled in the art of transmission design.

When the engine 1112 is on and the electric motor 1114 is off, the transmission 1116 is operable as an eight-speed automatic transmission. A fixed reverse speed ratio is achieved by engaging torque-transmitting mechanisms 1162, 1166 and 1168. A first fixed forward speed ratio is achieved by engaging torque-transmitting mechanisms 1160, 1162 and 1168. A second fixed forward speed ratio is achieved by engaging torque-transmitting mechanisms 1162, 1164 and 1168. A third fixed forward speed ratio is achieved by engaging torque-transmitting mechanisms 1160, 1164 and 1168. A fourth fixed forward speed ratio is achieved by engaging torque-transmitting mechanisms 1164, 1166 and 1168. A fifth fixed forward speed ratio is achieved by engaging torque-transmitting mechanisms 1160, 1166 and 1168. A sixth fixed forward speed ratio is achieved by engaging torque-transmitting mechanisms 1160, 1164 and 1166. A seventh fixed forward speed ratio is achieved by engaging torque-transmitting mechanisms 1160, 1162, and 1166. An eighth fixed forward speed ratio is achieved by engaging torque-transmitting mechanisms 1162, 1164 and 1166. Each of these fixed forward speed ratios are engine-only operating modes, as the electric motor 1114 is off, and only the engine 1112 provides power to the output member 1119 though the planetary gear sets represented by levers 1120, 1130, 1140 and 1180. Torque may be provided to the output member 1119 in this manner with torque-transmitting mechanisms 1160, 1162, and 1168 engaged to establish friction launch of the output member 1119.

The transmission 1116 is also operable to provide an electric-only operating mode. In this operating mode, the engine 1112 is off, and only the electric motor 1114 is powering the node 1182 (sun gear member) with the torque-transmitting mechanisms 1160 and 1168 engaged, as well as a brake-type clutch, if one is provided (not shown), on the input member 1117 engaged. Torque may be provided to the output member 1119 in this manner to launch the output member 1119 (i.e., start rotation of the output member 1119 from a stationary state), establishing electric-only launch.

The transmission 1116 is operable in an electrically-variable operating mode in which the engine 1112 provides power to node 1126 (carrier member) and the electric motor 1114 provides power to nodes 1122 and 1182 (sun gear members), and the clutches 1160 and 1168 are engaged to allow split power flow paths through the nodes 1182 and 1142. Torque may be provided to the output member 1119 in this manner to launch the output member 1119, establishing combined friction and electric launch. A parallel hybrid operating mode may also be established by powering the electric motor 1114 during any of the third, fourth, fifth, and sixth forward speed ratios discussed above. An electrically-variable operating mode may be established by releasing the torque-transmitting mechanism 1162 and powering the electric motor 1114 during any of the fixed reverse, first, second, seventh and eighth fixed forward speed ratios. The operating modes of the transmission 1116 are set forth below in Table 12.

TABLE 12

| OPERATING MODE | ENGINE | ELECTRIC MOTOR | ENGAGED TORQUE-TRANSMITTING MECHANISMS AND CLUTCHES |
|---|---|---|---|
| Fixed Reverse Speed Ratio | On | Off | 1162, 1166, 1168 |
| Fixed First Forward Speed Ratio | On | Off | 1160, 1162, 1168 |
| Fixed Second Forward Speed Ratio | On | Off | 1162, 1164, 1168 |
| Fixed Third Forward Speed Ratio | On | Off | 1160, 1164, 1168 |
| Fixed Fourth | On | Off | 1164, 1166, 1168 |

TABLE 12-continued

| OPERATING MODE | ENGINE | ELECTRIC MOTOR | ENGAGED TORQUE-TRANSMITTING MECHANISMS AND CLUTCHES |
|---|---|---|---|
| Forward Speed Ratio | | | |
| Fixed Fifth Forward Speed Ratio | On | Off | 1160, 1166, 1168 |
| Fixed Sixth Forward Speed Ratio | On | Off | 1160, 1164, 1166 |
| Fixed Seventh Forward Speed Ratio | On | Off | 1160, 1162, 1166 |
| Fixed Eighth Forward Speed Ratio | On | Off | 1162, 1164, 1166 |
| Electric-Only Operating Mode | Off | On | 1160, 1168, brake on input member, if provided |
| Parallel Hybrid Operating Mode | On | On | 1160, 1164, 1168; or 1164, 1166, 1168; or 1160, 1166, 1168; or 1160, 1164, 1166 |
| Electrically-Variable Operating Mode | On | On | 1166, 1168; or 1160, 1168; or 1164, 1168; 1160, 1166; or 1164, 1166 |

In an alternative embodiment not shown, the motor 1114 is connected to node 1184 rather than node 1182. With this embodiment, following the engagement schedule set forth in Table 12 will result in electrically-variable operating modes corresponding with the first-fifth fixed forward speed ratios in Table 12 by releasing torque-transmitting mechanism 1168 and powering the electric motor 1114. A parallel hybrid operating mode may be established by powering the electric motor 1114 during any of the sixth-eighth fixed forward speed ratios in Table 12.

While the best modes for carrying out the invention have been described in detail, those familiar with the art to which this invention relates will recognize various alternative designs and embodiments for practicing the invention within the scope of the appended claims.

The invention claimed is:

1. A hybrid transmission operatively connectable with an engine, comprising:
an input member; an output member; a stationary member; multiple planetary gear sets, each with a first, a second, and a third member; and selectively engagable torque-transmitting mechanisms interconnecting the planetary gear sets, the input member, the output member, and the stationary member and engagable in different combinations to establish various operating modes between the input member and the output member; wherein the input member is operatively connected for rotation with the engine and is selectively connectable for rotation with the first member of one of the planetary gear sets by engagement of one of the torque-transmitting mechanisms;
an electric motor connected for rotation with the second member of another of the planetary gear sets; wherein the transmission is characterized by an absence of any additional electric motors used to add power to the input member, output member, stationary member, or multiple planetary gear sets;
a clutch connecting the input member for rotation with the electric motor; wherein the transmission is operable in an electric-only operating mode when the engine is off and the electric motor powers the second member to which the electric motor is connected for rotation and other ones of the torque-transmitting mechanisms are engaged; and wherein the transmission is operable in an engine-only operating mode when the electric motor is off and the clutch is engaged such that the engine powers the second member.

2. The transmission of claim 1, wherein the transmission is operable in a parallel hybrid operating mode and alternatively in an electrically-variable operating mode when said one of the torque-transmitting mechanisms is engaged and the engine and electric motor are on.

3. The transmission of claim 1, wherein the multiple planetary gear sets are representable by a first four-node lever having a first, a second, a third, and a fourth node, and by a second three-node lever having a fifth, a sixth, and a seventh node, each node corresponding with at least one member of the planetary gear sets; wherein said first member is the first node such that said one of the torque-transmitting mechanisms selectively connects the input member for rotation with the first node; wherein the output member is connected for rotation with the second node; and wherein said second member is the fifth node such that the electric motor is connected for rotation with the fifth node and the clutch connects the engine for rotation with the fifth node.

4. The transmission of claim 3, wherein the third node is selectively connectable to the stationary member by engagement of a second of the torque-transmitting mechanisms and is selectively connectable to the sixth node by engagement of a third of the torque-transmitting mechanisms; wherein the fourth node is selectively connectable to the sixth node by engagement of a fourth of the torque-transmitting mechanisms; wherein the first node is selectively connectable with the stationary member by engagement of a fifth of the torque-transmitting mechanism; and wherein the seventh node is continuously grounded to the stationary member.

5. The transmission of claim 4, wherein the transmission is operable in an electric-only launch mode with the electric motor delivering power to the output member through the planetary gear sets with the fourth and fifth torque-transmitting mechanisms engaged; wherein the transmission is operable in a friction launch mode with the engine delivering power to the output member through the planetary gear sets with the fourth and fifth torque-transmitting mechanism engaged; and wherein the transmission is operable in a combined friction and electric launch mode with both the engine and the electric motor delivering power to the output member through the planetary gear sets with the fourth and fifth torque-transmitting mechanisms engaged.

6. The transmission of claim 1, wherein the transmission includes a transmission casing; and wherein the electric motor and clutch are located axially adjacent the engine, between the engine and the planetary gear sets, concentrically arranged around the input member within the transmission casing.

7. The transmission of claim 1, wherein the clutch is a one-way clutch that automatically engages when the engine powers the input member such that the input member rotates faster than the electric motor, and that overruns when the electric motor powers the second member and rotates faster than the engine.

8. A hybrid transmission operatively connectable with an engine, comprising:
an input member; an output member; a stationary member; multiple planetary gear sets, each with a first, a second, and a third member, the members representing a sun gear member, a carrier member and a ring gear member; and selectively engagable torque-transmitting mechanisms interconnecting the planetary gear sets, the input member, the output member, and the stationary member and engagable in different combinations to establish various operating modes, including six forward fixed speed ratios between the input member and the output member;

wherein the input member is connected for rotation with the engine, is selectively connectable for rotation with the first member of one of the planetary gear sets by engagement of one of the torque-transmitting mechanisms; and is continuously connected for rotation with the second member of another of the planetary gear sets;

an electric motor connected for rotation with the sun gear member of said another of the planetary gear sets;

a clutch selectively engagable to ground the sun gear member of said another of the planetary gear sets to the stationary member; wherein the transmission is operable in an electric-only operating mode when the engine is off, the clutch is not engaged, and the electric motor powers the sun gear member of said another of the planetary gear sets; and wherein the transmission is operable in an engine-only operating mode when the electric motor is off, the clutch is engaged and the engine powers the second member of said another of the planetary gear sets.

9. The transmission of claim 8, wherein the transmission is operable in a parallel hybrid operating mode when said one of the torque-transmitting mechanisms is engaged, selected others of said torque-transmitting mechanisms are engaged, the engine and electric motor are on, and the clutch is not engaged; and wherein the transmission is operable in an electrically-variable operating mode when said one of the torque-transmitting mechanisms is not engaged and another of said torque-transmitting mechanisms is engaged to ground the first member of said one of the planetary gear sets to the stationary member.

10. The transmission of claim 8, wherein the transmission includes a transmission casing; and wherein the electric motor and clutch are located axially adjacent the engine, between the engine and the planetary gear sets, concentrically arranged around the input member within the transmission casing.

11. The transmission of claim 8, further comprising:
an input member-braking torque-transmitting mechanism engagable to ground the input member to the stationary member;

wherein the transmission is operable in an electric-only launch mode in which the electric motor delivers power to the output member through the planetary gear sets with the input-member braking torque-transmitting mechanism engaged, the clutch is not engaged, and at least some other ones of said torque-transmitting mechanisms are engaged; wherein the transmission is operable in a friction launch mode in which the engine delivers power to the output member through the planetary gear sets with the input-braking torque-transmitting mechanism not engaged, at least some of said other torque-transmitting mechanisms and said clutch are engaged; and wherein the transmission is operable in a combined friction and electric launch mode in which both the engine and the electric motor deliver power to the output member through the planetary gear sets with neither the input-braking torque-transmitting mechanism nor the clutch engaged, and in which at least some other ones of said torque-transmitting mechanisms engaged.

12. A hybrid transmission operatively connectable with an engine, comprising:
an input member; an output member; a stationary member; first, second, third, and fourth planetary gear sets, each with a ring gear member, a sun gear member, and a carrier member; four selectively engagable torque-transmitting mechanisms interconnecting the planetary gear sets, the input member, the output member, and the stationary member and engagable in different combinations to establish different operating modes, including eight forward fixed speed ratios between the input member and the output member;

wherein the input member is connected for rotation with the engine, is selectively connectable for rotation with the sun gear member of one of the third and fourth planetary gear sets by engagement of one of the torque-transmitting mechanisms; and is continuously connected for rotation with the carrier member of one of the first and second planetary gear sets;

an electric motor connected for rotation with the sun gear member of said one of the first and second planetary gear sets;

a clutch selectively engagable to ground the sun gear member of said one of the first and second planetary gear sets to the stationary member; wherein the transmission is operable in an electric-only operating mode in which the engine is off, the clutch is not engaged, and the electric motor powers the sun gear member of said one of the first and second planetary gear sets; and wherein the transmission is operable in an engine-only operating mode in which the electric motor is off, the clutch is engaged and the engine powers the carrier member to which the input member is continuously connected.

13. The transmission of claim 12, wherein the transmission is operable in a parallel hybrid operating mode when any combination of three of the four torque-transmitting mechanisms are engaged, the engine and electric motor are on, and the clutch is not engaged; and wherein the transmission is operable in an electrically-variable operating mode when selected different combinations of two of said torque-transmitting mechanisms are engaged, the engine and the electric motor are on, and the clutch is not engaged.

14. The transmission of claim 12, wherein the transmission includes a transmission casing; and wherein the electric motor and clutch are located axially adjacent the engine, between the engine and the planetary gear sets, concentrically arranged around the input member within the transmission casing.

15. The transmission of claim 12, further comprising:
an input braking-torque transmitting mechanism engagable to ground the input member to the stationary member; and wherein the input braking-torque transmitting mechanism is engaged in the electric-only operating mode.

16. The transmission of claim 12, wherein the planetary gear sets are single-pinion gear sets.

17. The transmission of claim 12, wherein one of the planetary gear sets is a double-pinion gear set.

18. The transmission of claim 12, wherein each of said planetary gear sets has two of said sun gear member, carrier member, and ring gear member continuously connected for common rotation with different respective ones of said members of different ones of said planetary gear sets.

* * * * *